US012681878B2

(12) United States Patent
Hong et al.

(10) Patent No.: US 12,681,878 B2
(45) Date of Patent: Jul. 14, 2026

(54) DATA PROCESSING METHOD AND ELECTRONIC DEVICE USING SCATTER GATHER DMA

(71) Applicant: REBELLIONS INC., Seongnam-si (KR)

(72) Inventors: Boeui Hong, Seongnam-si (KR); Jaedon Lee, Seongnam-si (KR); Jiun Yu, Seongnam-si (KR); Hyebin Jeong, Seongnam-si (KR); Sangjun Nam, Seongnam-si (KR); Yoonho Boo, Seongnam-si (KR); Hongyun Kim, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/079,258

(22) Filed: Mar. 13, 2025

(65) Prior Publication Data

US 2026/0003810 A1     Jan. 1, 2026

(30) Foreign Application Priority Data

Jul. 1, 2024     (KR) ........................ 10-2024-0086016

(51) Int. Cl.
*G06F 13/28*          (2006.01)

(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 8,176,252 B1 | 5/2012 | Alexander et al. | |
| 8,495,301 B1 * | 7/2013 | Alexander | .............. G06F 13/28 |
| | | | 710/22 |
| 10,282,328 B2 * | 5/2019 | Lee | ..................... G06F 13/1673 |
| 10,983,920 B2 * | 4/2021 | Thyamagondlu | ....... G06F 13/28 |
| 11,881,997 B1 * | 1/2024 | Nadeem | .............. H04L 41/0893 |
| 11,886,365 B2 * | 1/2024 | George | .................. G06F 13/28 |
| 12,192,023 B2 * | 1/2025 | Sen | ..................... G06F 13/4022 |
| 2018/0101488 A1 | 4/2018 | Mangalampalli et al. | |
| 2018/0121796 A1 * | 5/2018 | Deisher | ................. G06N 3/045 |
| 2018/0225116 A1 * | 8/2018 | Henry | ................... G06N 3/044 |

(Continued)

FOREIGN PATENT DOCUMENTS

| | | |
|---|---|---|
| KR | 10-2022-0047797 A | 4/2022 |
| KR | 10-2023-0034373 A | 3/2023 |

(Continued)

*Primary Examiner* — Henry Tsai
*Assistant Examiner* — Christopher A Bartels
(74) *Attorney, Agent, or Firm* — BROADVIEW IP LAW, PC

(57) ABSTRACT

A data processing method using a scatter gather direct memory access (SG DMA), the method comprising: obtaining information for a rule table for specific subtasks of a SG DMA from a host, deriving the rule table for the specific subtasks based on the information, deriving source addresses, destination addresses and data sizes for the specific subtasks based on the rule table, and performing a SG DMA operation to transfer data of the data sizes located at the source addresses of a first memory to data spaces of the data sizes located at the destination addresses of a second memory.

20 Claims, 11 Drawing Sheets

Obtaining information for rule table for specific subtasks of scatter gather direct memory access — S1000

Deriving rule table for specific subtasks based on information — S1010

Deriving source addresses, destination addresses, and data sizes for specific subtasks based on rule table — S1020

Performing SG DMA operation to transfer data of data sizes located at source addresses of first memory to data spaces of data sizes located at destination addresses of second memory — S1030

(56)  References Cited

U.S. PATENT DOCUMENTS

| | | | | |
|---|---|---|---|---|
| 2020/0377956 A1* | 12/2020 | Vogelstein | ........... | C12Q 1/6827 |
| 2021/0073151 A1* | 3/2021 | Sen | ......................... | H04L 45/74 |
| 2021/0406437 A1* | 12/2021 | Wu | ..................... | G06F 15/7889 |
| 2022/0012201 A1* | 1/2022 | Schaub | .............. | G06F 13/1642 |
| 2022/0083486 A1* | 3/2022 | George | .................. | G06F 13/28 |
| 2022/0198254 A1* | 6/2022 | Dalli | ...................... | G06N 3/084 |
| 2022/0222075 A1* | 7/2022 | Pawlowski | ......... | G06F 9/30003 |
| 2022/0261032 A1* | 8/2022 | Bateni | ....................... | G06F 1/12 |
| 2022/0358063 A1* | 11/2022 | Oved | ..................... | G06F 3/061 |
| 2023/0162010 A1* | 5/2023 | Mirhoseini | ......... | G06F 11/3062 |
| | | | | 706/15 |
| 2023/0231811 A1* | 7/2023 | Dalal | ................. | G06F 13/1605 |
| | | | | 710/308 |
| 2023/0259467 A1* | 8/2023 | Deidda | ................. | G06F 3/0611 |
| | | | | 710/22 |
| 2023/0297820 A1* | 9/2023 | Mathews | ............. | G06N 3/0464 |
| | | | | 708/420 |
| 2024/0169180 A1* | 5/2024 | Yang | ...................... | G06N 3/063 |
| 2024/0184723 A1* | 6/2024 | Lee | .......................... | G06F 13/28 |
| 2024/0273198 A1* | 8/2024 | Vukmirovic | ........... | G06N 20/00 |
| 2024/0273411 A1* | 8/2024 | Mueck | .................. | H04L 9/3263 |
| 2024/0335311 A1* | 10/2024 | Naser | ................... | A61B 5/7264 |
| 2025/0232780 A1* | 7/2025 | He | ........................... | G10L 15/16 |
| 2026/0037463 A1* | 2/2026 | Itani | ........................ | G06F 13/28 |

FOREIGN PATENT DOCUMENTS

| | | | |
|---|---|---|---|
| WO | 2021/032946 A1 | 2/2021 | |
| WO | 2022/010673 A1 | 1/2022 | |

* cited by examiner

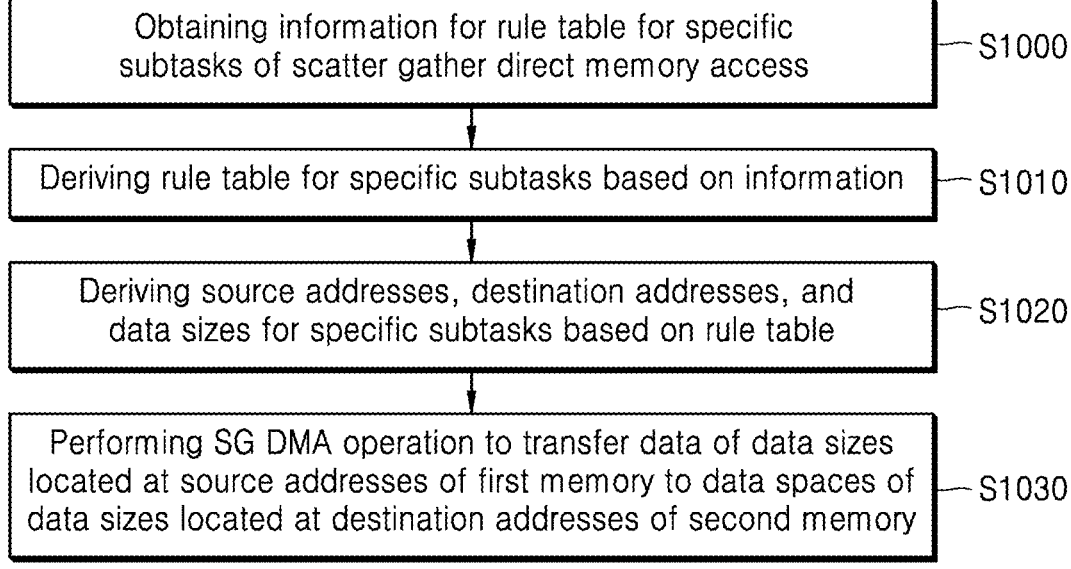

| | |
|---|---|
| Obtaining information for rule table for specific subtasks of scatter gather direct memory access | S1000 |
| Deriving rule table for specific subtasks based on information | S1010 |
| Deriving source addresses, destination addresses, and data sizes for specific subtasks based on rule table | S1020 |
| Performing SG DMA operation to transfer data of data sizes located at source addresses of first memory to data spaces of data sizes located at destination addresses of second memory | S1030 |

DATA PROCESSING METHOD AND ELECTRONIC DEVICE USING SCATTER GATHER DMA

CROSS REFERENCE TO RELATED APPLICATION

The present application claims priority to Korean Patent Application No. 10-2024-0086016, filed on Jul. 1, 2024, the entire contents of which is incorporated herein for all purposes by this reference.

TECHNICAL FIELD

The present disclosure relates to a data processing method and electronic device using Scatter Gather Direct Memory Access (SG DMA) in AI service providing system.

BACKGROUND

As artificial intelligence (AI) technology advances, AI services utilizing it are becoming more widespread, and the size and complexity of data transmitted and inference work performed to support AI models such as LLM (Large Language Model) are increasing.

However, the conventional method of performing SG DMA operation to transfer data for inference tasks may cause problems in that the space complexity of memory increases in proportion to the increase in the dimension and/or number of input variables when transferring data for tasks for AI service.

Accordingly, there is a need for a method or system that reduces data memory space complexity and improves work efficiency in performing SG DMA operation that transfer data for inference tasks for AI service supporting AI model such as LLM.

SUMMARY

An object of the present disclosure is to provide a data processing method and an electronic device that performs a scatter gather direct memory access (SG DMA) by deriving source address/destination address/data size information using an equation derived from a rule table to solve the above problems.

In order to achieve the object, A data processing method according to an embodiment of the present disclosure includes: obtaining information for a rule table for specific subtasks of a SG DMA from a host, deriving the rule table for the specific subtasks based on the information, deriving source addresses, destination addresses and data sizes for the specific subtasks based on the rule table, and performing a SG DMA operation to transfer data of the data sizes located at the source addresses of a first memory to data spaces of the data sizes located at the destination addresses of a second memory, wherein the rule table includes a coefficient matrix including coefficients and a variable matrix including variables, and wherein based on a matrix operation of the coefficient matrix and the variable matrix, a source address equation for deriving the source addresses, a destination address equation for deriving the destination addresses, and a data size equation for deriving the data sizes are derived.

An electronic device according to another embodiment of the present disclosure includes: a Command Processor (CP) operating firmware for a scatter gather direct memory access (SG DMA) operation; and a device performing a SG DMA operation between a first memory and a second memory, wherein the device configured to: obtain information for a rule table for specific subtasks of a SG DMA from a host; derive the rule table for the specific subtasks based on the information; derive source addresses, destination addresses and data sizes for the specific subtasks based on the rule table; and perform a SG DMA operation to transfer data of the data sizes located at the source addresses of the first memory to data spaces of the data sizes located at the destination addresses of the second memory, wherein the rule table includes a coefficient matrix including coefficients and a variable matrix including variables, and wherein based on a matrix operation of the coefficient matrix and the variable matrix, a source address equation for deriving the source addresses, a destination address equation for deriving the destination addresses, and a data size equation for deriving the data sizes are derived.

According to an embodiment of the present disclosure, a SG DMA operation may be performed with information for a subtask of SG DMA generated based on a rule table, and through this, the effect of reducing the space complexity for the SG DMA operation may be generated.

According to an embodiment of the present disclosure, an embodiment of performing a SG DMA operation using a rule table that may be set to various constants and/or coefficients may produce an effect of improving the efficiency of performing the SG DMA operation by adaptively considering a data transfer structure.

According to an embodiment of the present disclosure, a SG DMA operation may be performed based on a plurality of rule tables, and through this, the effect of reducing complexity and improving efficiency may be generated by reducing the information transfer process for performing a SG DMA operation at a location according to various rules for performing LLM task.

BRIEF DESCRIPTION OF THE DRAWINGS

FIG. 2 is an exemplary block diagram illustrating an electronic device performing an LLM task according to an embodiment of the present disclosure.

FIGS. 3A and 3B are exemplary block diagrams illustrating DMA performed in the electronic device in an embodiment of the present disclosure.

FIG. 9 exemplarily illustrates a cycle of the SG DMA operation performed in a DMA engine according to another embodiment of the present disclosure.

FIG. 10 is a flowchart explaining in detail a DMA method of an electronic device for AI task according to an embodiment of the present disclosure.

DETAILED DESCRIPTION

Figure 1:
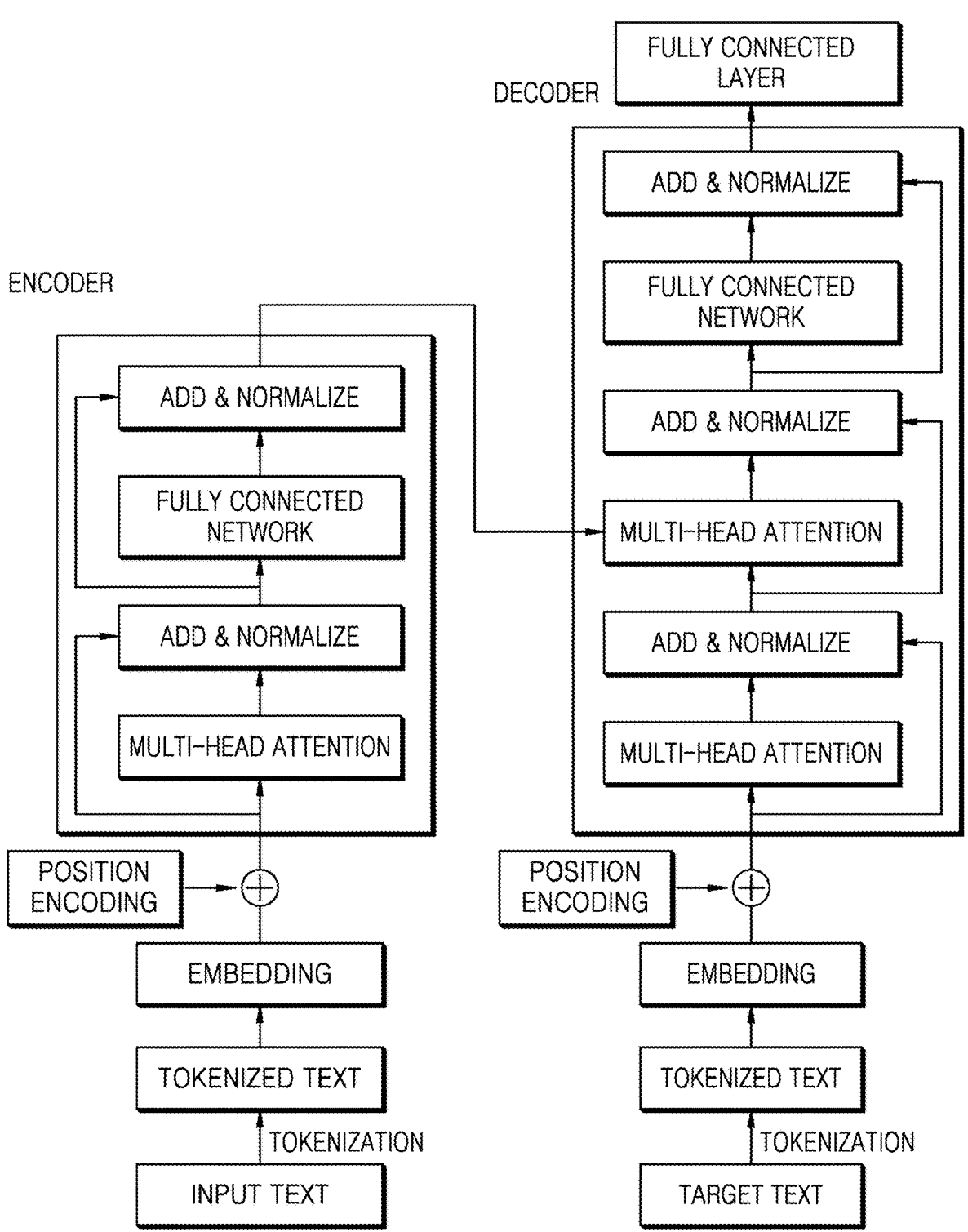
FIG. 1 is an exemplary block diagram illustrating a neural network application in encoder-decoder format according to an embodiment of the present disclosure.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as "circuit (circuitry)" may refer to a circuit in hardware, but may also refer to a circuit in software. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, "processor" may refer to an application-specific integrated circuit (ASIC), a programmable logic device (PLD), or a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage, registers, and so on. The memory is said to be in electronic communication with a processor if the processor can read information from and/or write information to the memory. The memory integrated with the processor is in electronic communication with the processor.

In the present disclosure, "each of a plurality of A" may refer to each of all components included in the plurality of A, or may refer to each of some of the components included in a plurality of A.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In addition, in the following examples, "determining whether it is less than" or "if it is less than" are disclosed, but "determining whether it is less than or equal to" or "if it is less than or equal to" may also be applied to the examples.

Before describing various examples of the present disclosure, terms used herein will be explained.

In the present disclosure, "instruction" may refer to a series of computer-readable commands grouped based on function, which are components of a computer program and executed by a processor.

In the present disclosure, "network" may be implemented as a wired network such as a Local Area Network (LAN), a Wide Area Network (WAN), or a Value Added Network (VAN), or any type of wireless network such as a mobile radio communication network or a satellite communication network.

According to an embodiment of the present disclosure, a language model (LM) may mean a model learned to output statistically the most appropriate output based on an input value (natural language, for example, a user's sentence). In addition, a large language model (LLM) may mean a large language model having parameters ranging from several tens of billions to several hundred billion. LLM may achieve much better performance in various fields of natural language processing, including translation and summarization, than existing small-scale language models.

For example, a LLM may be a neural network application that operates in an encoder-decoder format.

FIG. 1 is an exemplary block diagram illustrating a neural network application in encoder-decoder format according to an embodiment of the present disclosure.

Referring to FIG. 1, the input text may first be tokenized into individual word tokens, and may be encoded through an embedding layer before being input to an encoder. Then, an output value may be derived by adding a positional encoding vector to each embedded word, and the output value may pass through a multi head self-attention layer. Here, the output value may be called embedding. The multi head self-attention layer may be followed by an add & normalize step that performs layer normalization and adds original embedding through skip connections. Finally, the embedding derived through the add & normalize step may be fed into a "fully connected layer", which is a small multilayer perceptron consisting of two fully connected layers with a nonlinear activation function in between, and then the output embedding may go through the add & normalize step again before being passed to the multi head self-attention of the decoder stage.

Referring to FIG. 1, a decoder of the neural network application is similar to the encoder in overall structure, but differs in that the input and output are different. The encoder of the neural network application may receive input text to be processed, such as translation or summary, and the decoder may generate text on which the processing, such as translation or summary, has been performed.

In addition, for example, the process of generating a word by a decoder may be called a decoding step. In an electronic device performing LLM, when performing a specific decoding step, previously used data may be cached and reused. In order to cache and reuse the previously used data, direct memory access (DMA) may be performed in the electronic device. For example, DMA may mean a function of directly accessing memory such as RAM or a storage device without going through a processing of the CPU in a peripheral device of the device to obtain necessary data.

In addition, for example, in an electronic device, Scatter Gather direct memory access (SG DMA) may be performed. For example, all data required for an LLM task may be transferred to a main memory in advance. The main memory may include data pre-stored for the LLM task. The data may include a rule table for a Scatter-Gather operation, i.e., SG DMA, and data for processing. Meanwhile, when performing an LLM task based on the data, if data is always moved from the main memory, the memory access latency may significantly increase. Therefore, prior to data processing, data movement between the main memory and an L2 cache and/or an L1 cache may be performed using SG DMA to minimize memory access latency.

Figure 2:
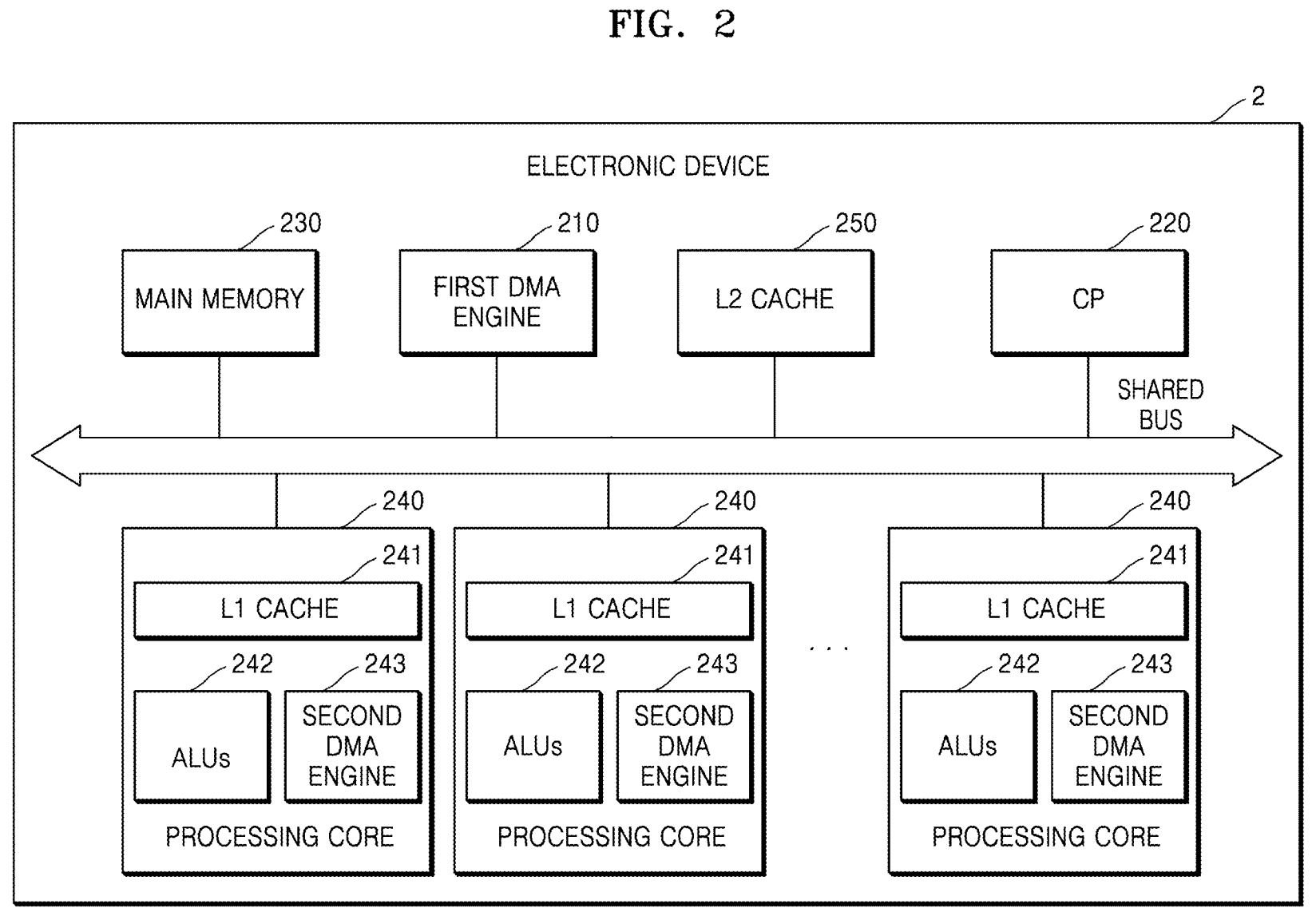

FIG. 2 is an exemplary block diagram illustrating an electronic device performing an LLM task according to an embodiment of the present disclosure.

Referring to FIG. 2, an electronic device (2) according to an embodiment of the present disclosure may include a first DMA engine (210), a command processor (CP)(220), a main memory (230), at least one processing core (240) and/or an L2 cache (250). Here, the processing core (240) may be composed of an L1 cache (241), Arithmetic Logic Units (ALUs)(242) and/or a second DMA engine (243). The processing core (240) may be a processing device for processing an AI workload.

The first DMA engine (210) of FIG. 2 may be positioned externally, separately from the processing core (240), and the second DMA engine (243) may be positioned within the processing core (240).

In addition, for example, a capacity of a memory may be configured in the order of the main memory (230), L2 cache (250), and L1 cache (241). That is, the main memory (230) may be the memory with the highest capacity, the L2 cache (250) may be a memory with a capacity smaller than the main memory (230) but larger than the L1 cache (241), and the L1 cache (241) may be a memory with a capacity smaller than the main memory (230) and the L2 cache (250). For example, the main memory (230) may be a DRAM (Dynamic Random Access Memory), the L1 cache (241) and the L2 cache (250) may be SRAM (Static Random Access Memory), and the L1 cache (241) and the L2 cache (250) may be read/written faster than the main memory (230).

The main memory (230) and the L2 cache (250) may communicate using a shared bus. In addition, the main memory (230) and the L1 cache (241) of the processing core (240), and the L2 cache (250) and the L1 cache (241) of the processing core (240) may also communicate using the shared bus. For example, to minimize memory access latency before performing an LLM task based on the data, data of a certain size may be moved from the main memory (230) to the L2 cache (250) and/or the L1 cache (241). If it is necessary to move some of the data included in the main memory (230), the SG DMA may be used. That is, if it is necessary to move some of the data included in the main memory (230), the SG DMA operation may be performed. For example, data in multiple locations in the main memory (230), i.e., data in non-contiguous memory spaces, may be moved to contiguous memory space of the L2 cache (250) and/or the L1 cache (241), and in this case, a gather operation of the SG DMA may be used.

In addition, since data located in the main memory (230) with a high capacity must be updated again after data processing for the LLM task is completed, the SG DMA may be used. For example, data in continuous memory space of the L2 cache (250) and/or the L1 cache (241) may be moved to multiple locations of the main memory (230), i.e., non-contiguous memory spaces, and in this case, a scatter operation of the SG DMA may be used.

For example, CP (220) may operate firmware for the scatter gather operation. For example, a host of the SG DMA operation connected to CP (220) may include general purpose CPUs, and may generate a task and/or subtask for the SG DMA operation based on a control signal received from the host, and may transmit the generated task and/or subtask to the DMA engine.

Figure 3A:
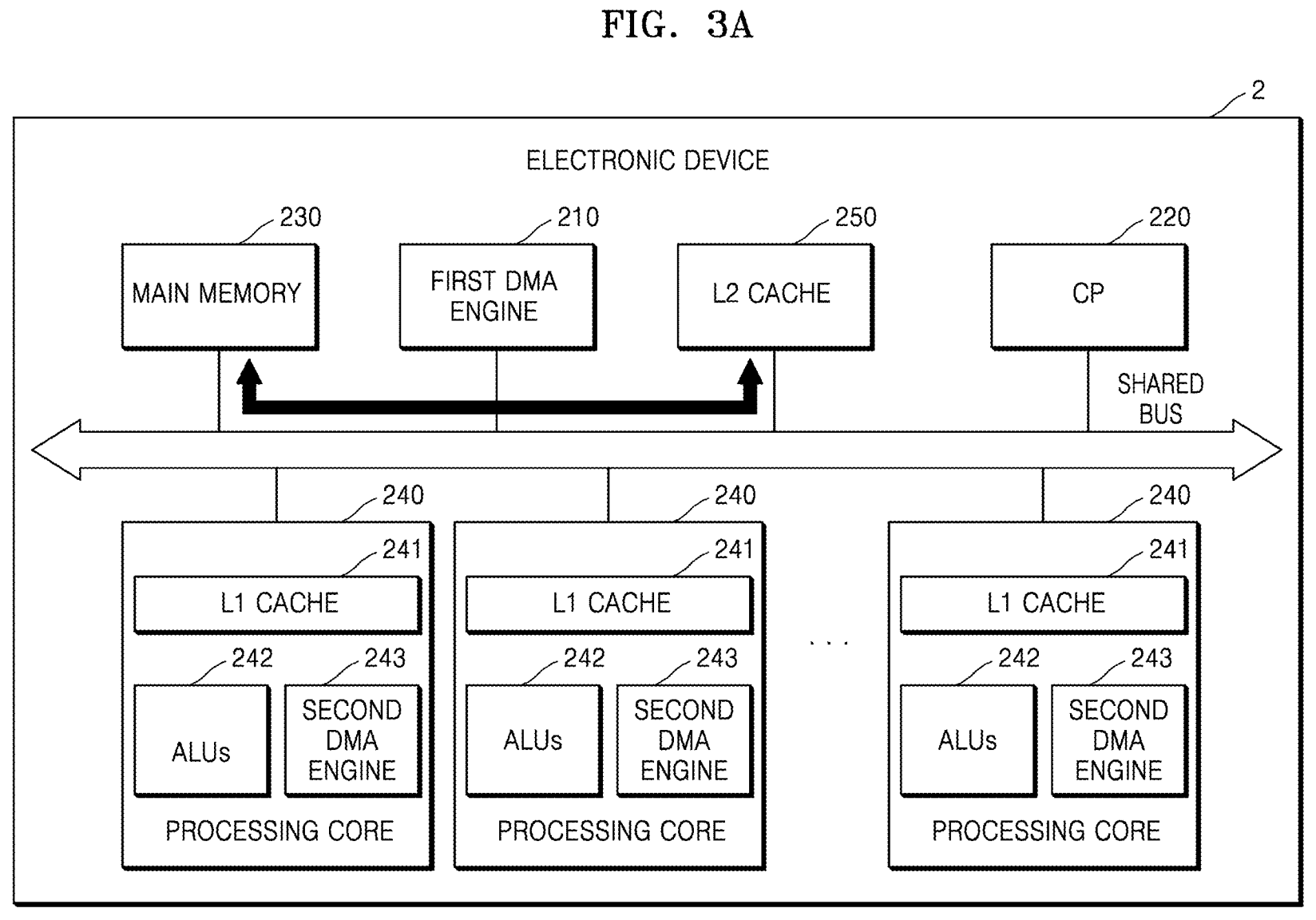
Figure 3B:
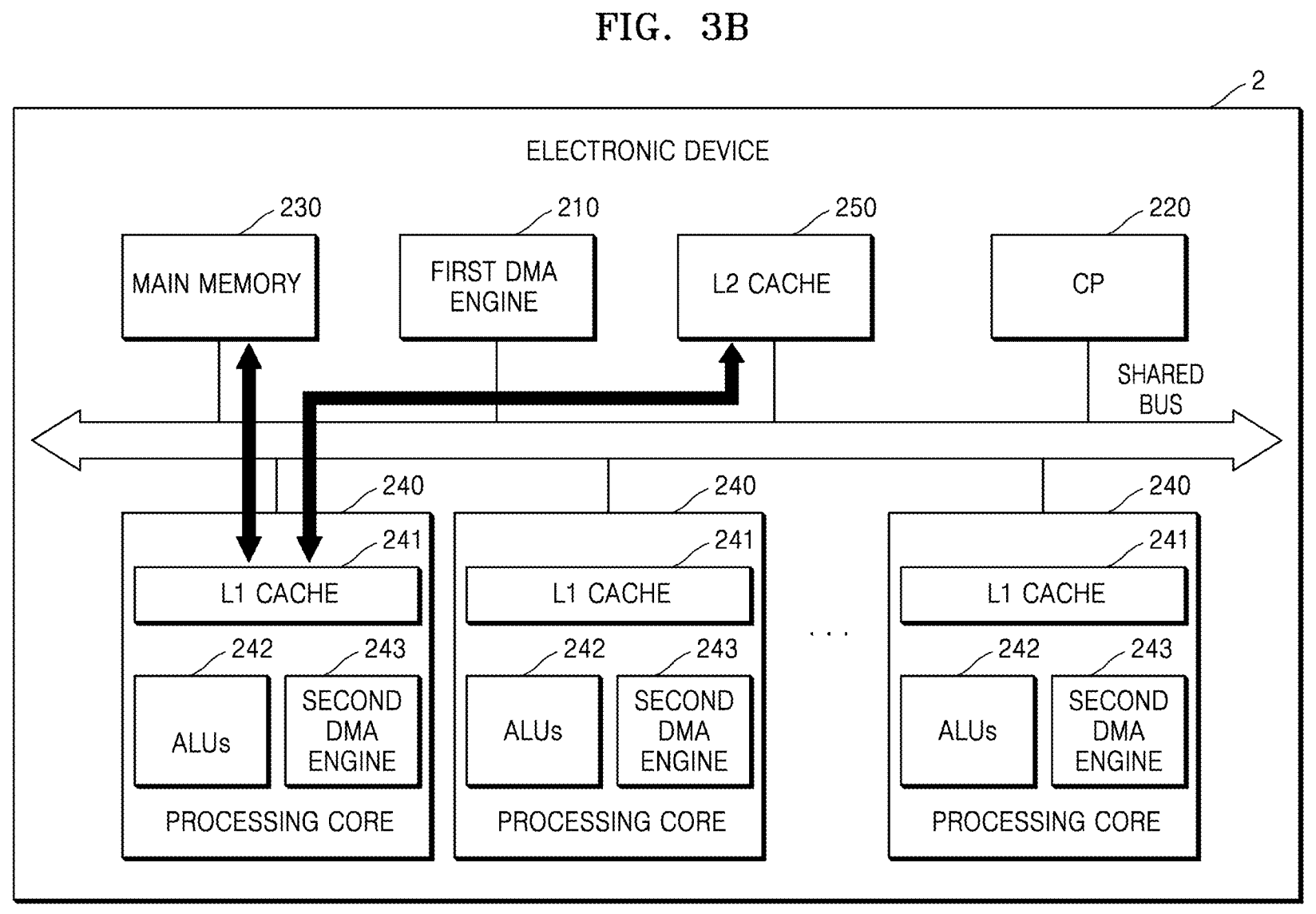

FIGS. 3A and 3B are exemplary block diagrams illustrating DMA performed in the electronic device in an embodiment of the present disclosure.

For example, referring to FIG. 3A, the first DMA engine (210) may perform bidirectional data transmission between the main memory (230) and the L2 cache (250).

For example, the first DMA engine (210) may perform a gather operation of the SG DMA to transmit data in non-contiguous memory spaces of the main memory (230) to a contiguous memory space of the L2 cache (250). The first DMA engine (210) may transmit data in the non-contiguous memory spaces of the main memory (230) to the contiguous memory space of the L2 cache (250). In addition, for example, the first DMA engine (210) may perform a scatter operation of the SG DMA to transmit data in a contiguous memory space of the L2 cache (250) to non-contiguous memory spaces of the main memory (230). The first DMA engine (210) may transmit data in the contiguous memory space of the L2 cache (250) to the non-contiguous memory spaces of the main memory (230).

In addition, for example, referring to FIG. 3B, the second DMA engine (243) may perform bidirectional data transfer between the main memory (230) and the L1 cache (241), and may perform bidirectional data transmission between the L2 cache (250) and the L1 cache (241).

For example, the second DMA engine (243) may perform a gather operation of the SG DMA to transmit data in non-contiguous memory spaces of the main memory (230) to a contiguous memory space in the L1 cache (241). The second DMA engine (243) may transmit data in the non-contiguous memory spaces of the main memory (230) to the contiguous memory space of the L1 cache (241). In addition, for example, the second DMA engine (243) may perform a scatter operation of the SG DMA to transmit data in the contiguous memory space of the main memory (230) to non-contiguous memory spaces of the L1 cache (241). The second DMA engine (243) may transmit data in the contiguous memory space of the main memory (230) to the non-contiguous memory spaces of the L1 cache (241).

In addition, for example, the second DMA engine (243) may perform a gather operation of the SG DMA to transmit data in the non-contiguous memory spaces of the L2 cache (250) to a contiguous memory space of the L1 cache (241). The second DMA engine (243) may transmit data in the non-contiguous memory spaces of the L2 cache (250) to the contiguous memory space of the L1 cache (241). In addition, for example, the second DMA engine (243) may perform a scatter operation of the SG DMA to transmit data in a contiguous memory space of the L2 cache (250) to non-contiguous memory spaces of the L1 cache (241). The second DMA engine (243) may transmit data in the contiguous memory space of the L2 cache (250) to the non-contiguous memory spaces of the L1 cache (241).

Meanwhile, cached data for reuse in performing the specific decoding step may be derived as in the following equation.

$$CachedData(i) = \{Batch, Decoding_i, HiddenData\} \qquad [Equation\ 1]$$

Here, CachedData(i) may represent cached data in an i-th decoding step. In addition, Batch may represent a batch index of the cached data, $Decoding_i$ may represent a decoding step index of the cached data, and HiddenData may represent a memory space size of the cached data.

In addition, for example, when performing a specific decoding step for the LLM task, if it is performed on limited hardware resources, the data may be divided and processed. In this case, the cached data for reuse in performing the specific decoding step may be derived as in the following equation.

$$CachedData(i, j) = \qquad [Equation\ 2]$$
$$\{Batch, Decoding_i, Operation_j, HiddenData/Operation\}$$

Here, CachedData(i, j) may represent cached data in a j-th operation step of the i-th decoding step. In addition, Batch may represent a batch index of the cached data, $Decoding_i$ may represent a decoding step index of the cached data, $Operation_j$ may represent an operation step index of the cached data, and HiddenData/Operation may represent a memory space size of the cached data. The space size may mean a data size that data occupies in the memory.

As shown in the equation 2, when data is divided and processed to perform a specific decoding step for the LLM task due to limited hardware resources, when the SG DMA is performed, an operation may be performed to collect only specific data from a four-dimensional array, rearrange and process it in a linear address space, and return it to their original location and update it.

When the SG DMA is performed, a source address and a destination address of accessed data may be determined. For example, when the SG DMA is performed, data of a source address of a first memory may be moved to a destination address of a second memory.

Figure 4:
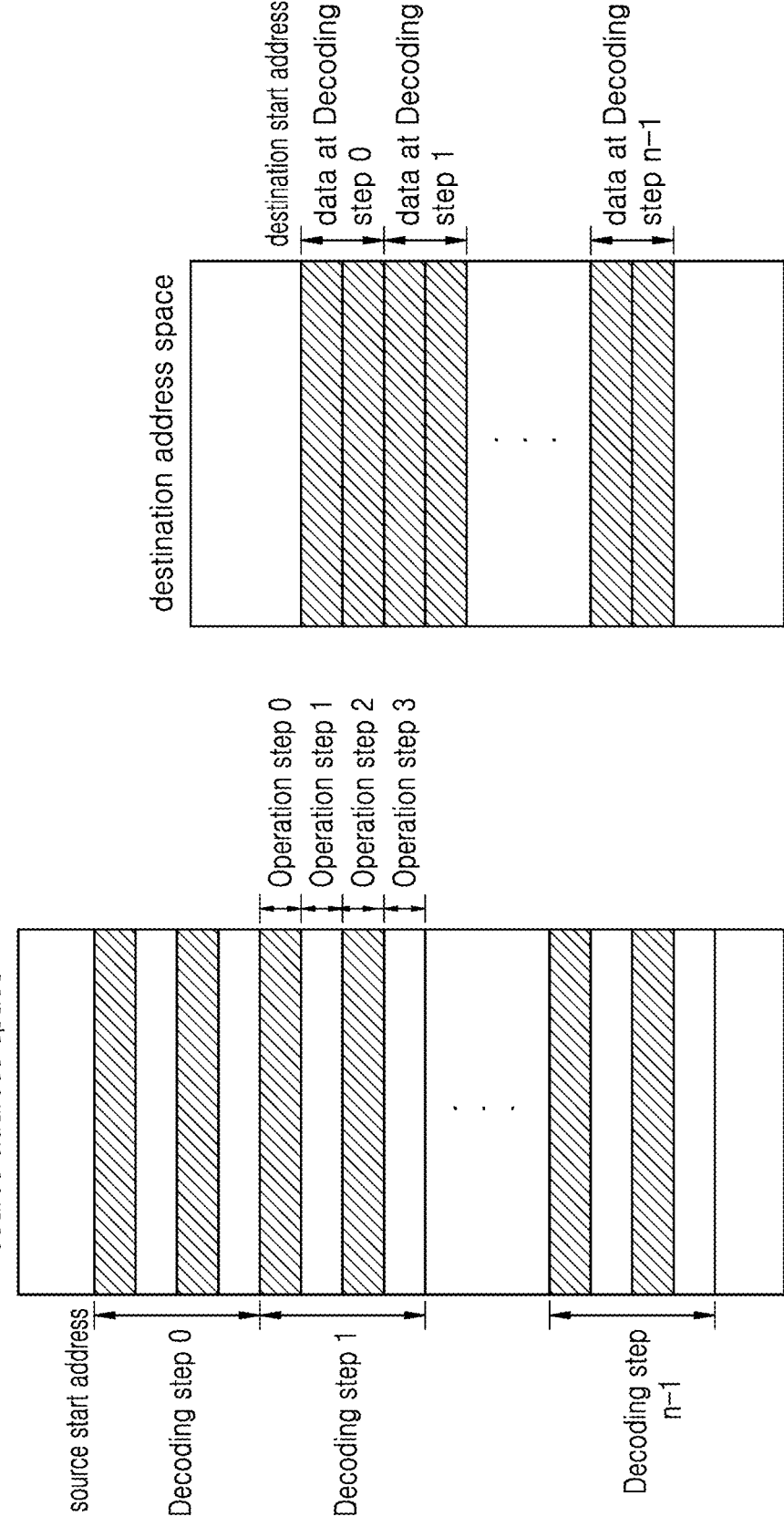
FIG. 4 is a diagram illustrating an embodiment in which the gather operation of SG DMA is performed.

FIG. 4 is a diagram illustrating an embodiment in which the gather operation of SG DMA is performed.

Referring to FIG. 4, data in the source address space may be located non-contiguously. A destination address may be determined for each of the non-contiguous data of the source address space, and the data may be moved to the determined destination address. As illustrated in FIG. 4, the non-contiguous data of the source address space may be moved to a continuous location of the destination address space through the gather operation of the SG DMA.

Figure 5:
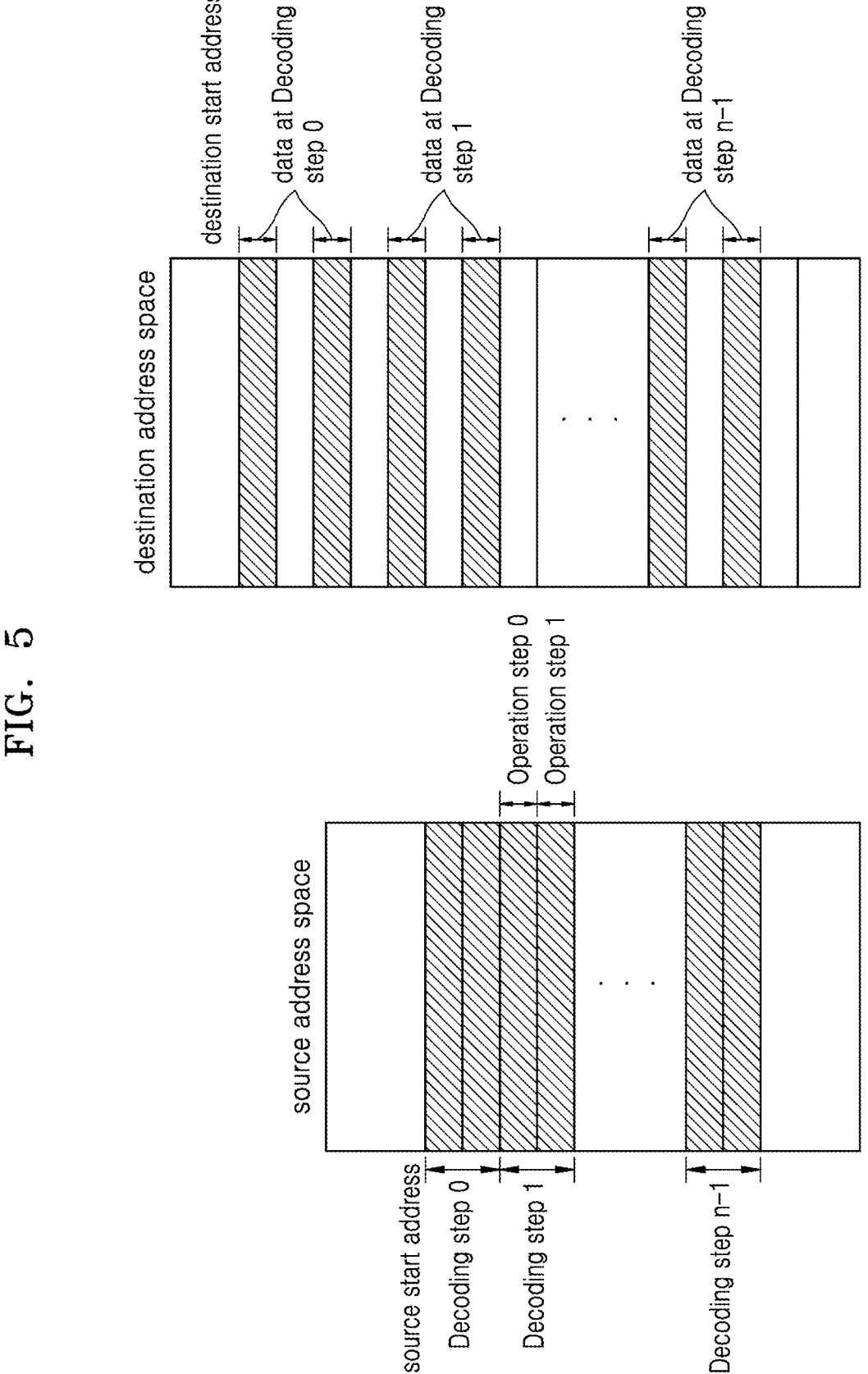
FIG. 5 is a diagram illustrating an embodiment in which the scatter operation of SG DMA is performed.

FIG. 5 is a diagram illustrating an embodiment in which the scatter operation of SG DMA is performed.

Referring to FIG. 5, data in the source address space may be located contiguously. A destination address may be determined for each of the contiguous data of the source address space, and the data may be moved to the determined destination address. As illustrated in FIG. 5, the contiguous data of the source address space may be moved to non-continuous locations of the destination address space through the scatter operation of the SG DMA.

Meanwhile, to perform the LLM task, the firmware may use an SG DMA engine to divide one command into N subcommands and execute them.

When the SG DMA is performed using N user-defined addresses, it is necessary to store source address information, destination address information, and size information for all subtasks of the decoding step in the memory, and therefore, the space complexity for performing the SG DMA may be $O(3n)$. Here, the notation representing the space complexity may be Big-O notation, and $O(3n)$ may represent that the complexity for performing the SG DMA increases in proportion to three times the input value.

Alternatively, a method may be applied to store information for a subtask of the SG DMA in the host and perform the SG DMA based on the stored information. In this case, a descriptor is transferred between the host and the DMA engine, and therefore, host interaction such as the host transferring data via PCIe is required whenever the SG DMA is performed. This may increase the memory space complexity and computational complexity for the SG DMA.

In order to solve the problem, the present disclosure proposes a method of storing a rule table for source address information, destination address information, and size information of a subtask in a device including a DMA engine, and performing SG DMA with source address information, destination address information, and size information generated based on the rule table in the DMA engine of the device. According to an embodiment proposed in the present disclosure, information for performing SG DMA may be defined as constant data, and after being transmitted from the host to the device once, the device may automatically derive information for the SG DMA and perform data processing according to the SG DMA. Therefore, according to the embodiment proposed in the present disclosure, the space complexity for performing the SG DMA may be a constant $O(1)$ that does not increase by an input value, and thereby may produce an effect of reducing the space complexity for the SG DMA operation.

The present disclosure proposes various embodiments for the rule table. For example, the rule table may have the number of variables and/or the dimensions of the variables variably adjusted. In addition, constants of the rule table may be set to various values, and different rules may be applied to source address information, destination address information, and/or size information. An embodiment of performing an SG DMA operation using a rule table that may be set to various constants and/or coefficients may produce an effect of improving the efficiency of performing the SG DMA operation by adaptively considering the data transfer structure.

For example, the rule table may be as follows $$\begin{bmatrix} a_{00} & a_{01} & c_0 \\ a_{10} & a_{11} & c_1 \\ a_{20} & a_{21} & c_2 \end{bmatrix} \begin{bmatrix} i \\ j \\ 1 \end{bmatrix} = \begin{bmatrix} SourceAddr \\ DestAddr \\ Size \end{bmatrix} \qquad \text{[Table 1]}$$

For example, referring to Table 1, the rule table may be composed of a coefficient matrix and a variable matrix part. The values of the coefficient matrix (e.g., $a_{00}$, $a_{01}$, $c_0$, $a_{10}$, $a_{11}$, $c_1$, $a_{20}$, $a_{21}$, $c_2$) may be set in table form. The device may obtain information for the coefficient matrix from the host, and configure the coefficient matrix based on the information. The device may be the first DMA engine or the second DMA engine described above. Source address information, destination address information, and/or size information for a subtask of the SG DMA may be derived based on the rule table including the configured coefficient matrix. The values and/or equations of each of the coefficients of the coefficient matrices (e.g., $a_{00}$, $a_{01}$, $c_0$, $a_{10}$, $a_{11}$, $c_1$, $a_{20}$, $a_{21}$, $c_2$) may be set, and the information for the coefficient matrix may represent the values and/or the equations of the coefficients. The device may obtain information for the coefficient matrix from the host, and derive the coefficient matrix based on the information for the coefficient matrix.

In addition, for example, variables of the rule table (for example, i, j, 1 included in the variable matrix) may be derived from a subtask. For example, the variables may be expressed by equations in the form of OpCode+Value. The device may obtain information for the variable matrix from the host and configure the variable matrix based on the information. The device may be the first DMA engine or the second DMA engine described above. For example, rules for variables of the rule table may be transmitted. That is, information for a variable matrix representing equations for variables of the rule table may be transmitted. Or, for example, a different equation may be set for each of the variables of the rule table, and information for a variable matrix representing equations for the variables may be transmitted. Or, for example, equations for variables of the rule table may be preset. That is, information for the variable matrix of the rule table may not be transmitted, and the device may derive the variables based on the preset equations.

In addition, for example, the number and/or dimensions of the variables may be set variously. That is, for example, the variable matrix of the rule table may include variables of various numbers and/or dimensions.

A pseudo code representing a process of deriving variables, source address information, destination address information, and/or data size information for a subtask of SG DMA based on the rule table may be as follows.

TABLE 2

```
GetVariable(SubtaskNumber, RuleTable_A, target_variable)
{
    Operation = RuleTable_A[target_variable]
    Value = RuleTable_A[target_variable + 1]
    Switch(Operation)
    case Divide:
        return SubtaskNumber / Value
    case Modular:
        return SubtaskNumber % Value
    case Multiply:
        return SubtaskNumber * Value
    ...
}
AddressGenerator(SubtaskNumber, RuleTable)
{
    SourceAddress = DestAddress = BlkSize = 0
    for (v = 0; v < VariableNum; v++) {
        Variable = GetVariable(SubtaskNumber, RuleTable_A, v)
        // Generate Source address
        SourceAddress += Variable * RuleTable_B[v]
        DestAdderess += Variable * RuleTable_B[VariableNum + v]
        BlkSize += Variable * RuleTable_B[VariableNum * 2 + v]
    }
    return SourceAddress, DestAddress, BlkSize
}
```

For example, the device may derive a source address equation, a destination address equation, and a data size equation of a subtask of the SG DMA based on the rule table, and may input variables for the subtask into the source address equation, the destination address equation, and the data size equation to derive the source address, the destination address, and the data size for the subtask. The source address equation may be called a source generation address equation or a source generation rule, the destination address equation may be called a destination generation address equation or a destination generation rule, and the data size equation may be called a destination generation address equation or a destination generation rule.

Also, as an example, the rule table may be as follows. Meanwhile, the table is only an example of the rule table and is not limited thereto.

[Table 3]

| HiddenDataSize | HiddenSataSize/2 | SourceStart*Addr* |
|---|---|---|
| Sum[ OperationDataSize_0, OperationDataSize_2] | operationDataSize | Dest*Start*Addr* |
| 0 | 0 | OperationDataSize |

-continued $$\begin{bmatrix} \begin{bmatrix} DecodingStep_i \\ OperationStep_j \\ 1 \end{bmatrix} \end{bmatrix}$$

For example, referring to Table 3, $a_{00}$ of the coefficient matrix of the rule table may be set to HiddenDataSize, $a_{01}$ to HiddenDataSize/2, $c_0$ to SourceStartAddr, $a_{10}$ to Sum [OperationDataSize$_0$, OperationDataSize$_2$], $a_{11}$ to OperationDataSize, $c_1$ to DestStartAddr, $a_{20}$ to 0, $a_{21}$ to 0, and $c_2$ to OperationDataSize. $a_{01}$ may also be HiddenDataSize/NumberofOperation.

Here, HiddenDataSize may represent a space size of data for the subtask of the decoding step, SourceStartAddr may represent a starting source address of the decoding step, OperationDataSize$_0$ may represent a space size of operation step 0, OperationDataSize$_2$ may represent a space size of operation step 2, and OperationDataSize may represent a space size of the operation step in the destination address space. OperationDataSize$_n$ may represent a space size of operation step n.

For example, the device may obtain information for the coefficient matrix from the host, and derive the coefficient matrix of the rule table based on the information for the coefficient matrix. That is, the device may obtain information for coefficients of the rule table from the host, and derive the coefficients of the rule table based on the information for the coefficients. Or, for example, the device may derive the coefficients of the rule table based on a preset rule for the coefficients of the rule table.

Also, for example, referring to Table 3, the variable matrix of the rule table may include DecodingStep$_i$, OperationStep$_j$, 1. That is, the variables of the rule table may be Decoding-Step$_i$, OperationStep$_j$. The variables may be derived based on rules for the variables of the rule table. For example, information for the rule may be transmitted from the host. Or, for example, the rules for the variables of the rule table may be preset.

For example, rules for variables DecodingStep$_i$ and OperationStep$_j$ of the rule table may be set as in the following equation.

$$DecodingStep_i = SubtaskNum_k/NumberofOperation \qquad \text{[Equation 3]}$$

$$OperationStep_j = SubtaskNum_k \bmod NumberofOperation$$

Here, DecodingStep$_i$ may represent a decoding step index of data for a k-th subtask of SG DMA, and OperationStep$_j$ may represent an operation step index of data for the k-th subtask of SG DMA. For example, referring to the equation 3, DecodingStep$_i$ and OperationStep$_j$ may be derived based on an index number of the subtask. SubtaskNum$_k$ illustrated in the equation 3 may represent an index number of the subtask, and NumberofOperation may represent the number of operations performed by SG DMA in the decoding step.

Figure 6:
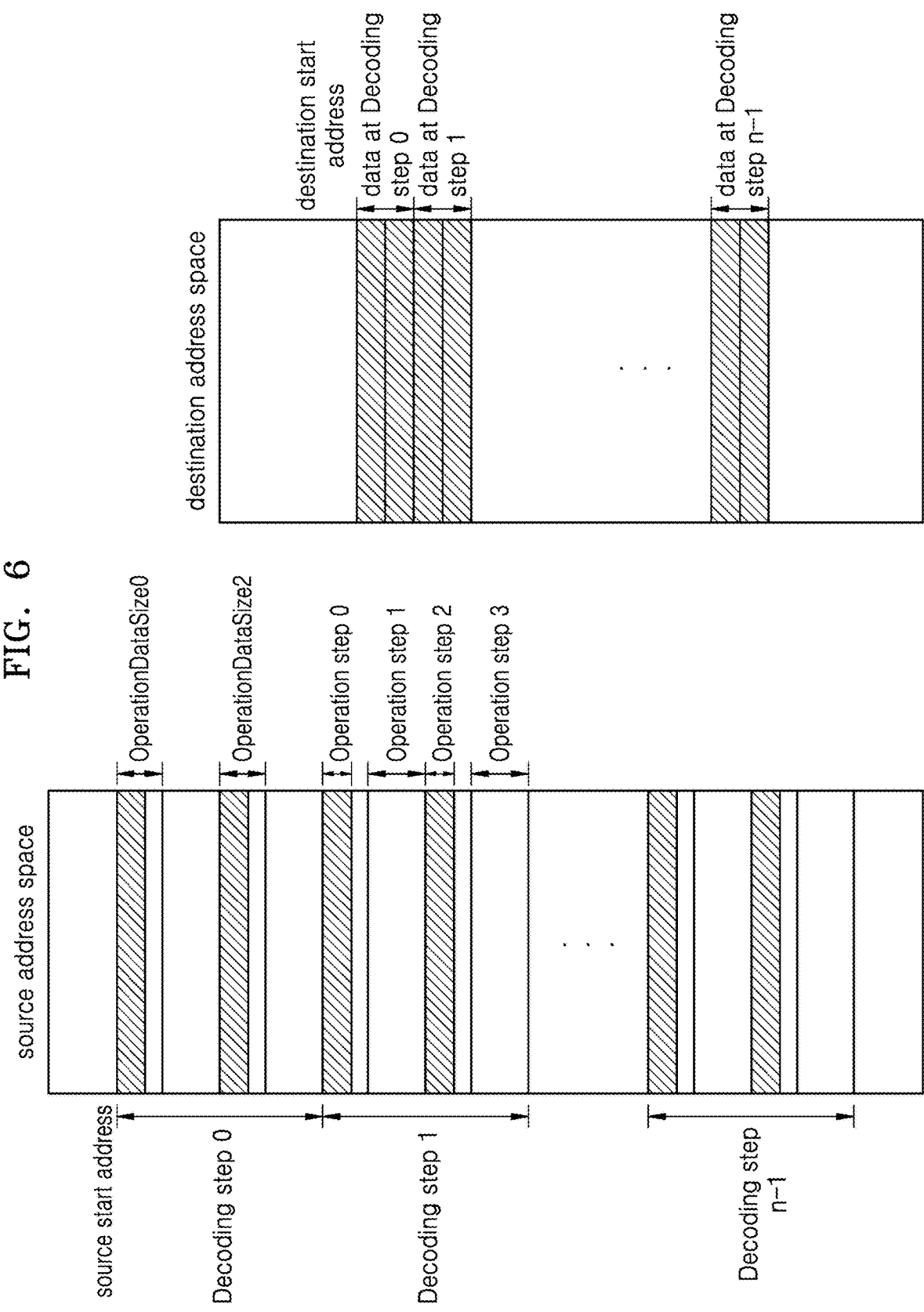
FIG. 6 is a diagram illustrating a gather operation of SG DMA according to an embodiment of the present disclosure.

FIG. 6 is a diagram illustrating a gather operation of SG DMA according to an embodiment of the present disclosure. As illustrated in FIG. 6, the gather operation of SG DMA may be performed based on the rule table according to the table 3 and the equation 3.

For example, when the rule table according to the table 3 and the equation 3 is applied, a source address equation, a destination address equation, and a data size equation for a subtask of SG DMA may be derived as follows. The rule table may be a rule table set for N specific subtasks, and a source address, a destination address, and a data size for each of the N specific subtasks may be derived using the source address equation, the destination address equation, and the data size equation derived based on the rule table.

$$SourceAddress(i, j) = \qquad \text{[Equation 4]}$$
$$HiddenData * i + (HiddenData/2) * j + SourceStartAddr$$

$$DestAddress(i, j) = OperationDataSize * n + DestStartAddr$$

$$Size(i, j) = OperationDataSize$$

For example, referring to the equation 4, data for a subtask of SG DMA may be derived as shown in the following table.

TABLE 4

Subtask #0
SourceAddress(0, 0) = HiddenData × 0 + (HiddenData/2) × 0 + SourceStartAddr
DestAddress(0, 0) = OperationDataSize × 0 + DestStartAddr
Size(0, 0) = OperationDataSize
Subtask #1
SourceAddress(0, 1) = HiddenData × 0 + (HiddenData/2) × 1 + SourceStartAddr
DestAddress(0, 1) = OperationDataSize × 1 + DestStartAddr
Size(0, 1) = OperationDataSize
Subtask #2
SourceAddress(1, 0) = HiddenData × 1 + (HiddenData/2) × 0 + SourceStartAddr
DestAddress(1, 0) = OperationDataSize × 2 + DestStartAddr
Size(1, 0) = OperationDataSize
Subtask #3
SourceAddress(1, 1) = HiddenData × 1 + (HiddenData/2) × 1 + SourceStartAddr
DestAddress(1, 1) = OperationDataSize × 3 + DestStartAddr
Size(1, 1) = OperationDataSize
Subtask #4
SourceAddress(2, 0) = HiddenData × 2 + (HiddenData/2) × 0 + SourceStartAddr
DestAddress(2, 0) = OperationDataSize × 4 + DestStartAddr
Size(2, 0) = OperationDataSize
Subtask #5
SourceAddress(2, 1) = HiddenData × 2 + (HiddenData/2) × 1 + SourceStartAddr
DestAddress(2, 1) = OperationDataSize × 5 + DestStartAddr
Size(2, 1) = OperationDataSize
. . .
Subtask #n
SourceAddress(n/2, n %2) = HiddenData × n/2 + (HiddenData/2) × (n %2) + SourceStartAddr
DestAddress(n/2, n %2) = OperationDataSize × n + DestStartAddr
Size(n/2, n %2) = OperationDataSize For example, referring to the equation 4, a decoding step index of data for subtask 0 of SG DMA may be derived as 0, and an operation step index of the data may be derived as 0. In addition, the source address (0,0) may be derived as HiddenData×0+(HiddenData/2)×0+SourceStartAddr, and the destination address (0,0) may be derived as Operation-DataSize×0+DestStartAddr. In addition, for example, the size of the data may be derived as OperationDataSize.

The DMA engine of the device may move data of a specific size (e.g., OperationDataSize) located at the derived source address (0,0) within the source address space to a space of a specific size at the derived destination address within the destination address space.

Also, for example, referring to the equation 4, a decoding step index of data for subtask 1 of SG DMA may be derived as 0, and an operation step index of the data may be derived as 1. The source address (0,1) may be derived as Hidden-Data×0+(HiddenData/2)×1+SourceStartAddr, and the destination address (0,1) may be derived as OperationDataSize×1+DestStartAddr. Also, for example, the size of the data may be derived as OperationDataSize.

Therefore, for example, referring to the equation 4, the decoding step index i of the data for the n-th subtask of the SG DMA may be derived as n/2, and the operation step index j of the data may be derived as (n % 2). The source address (i,j) may be derived as HiddenData X i+(Hidden-Data/2)×j+SourceStartAddr, and the destination address (i,j) may be derived as OperationDataSize×n+DestStartAddr. In addition, for example, the size of the data may be derived as OperationDataSize.

Based on the source address equation, destination address equation, and data size equation derived as in the equation 4, the device may perform a gather operation of the SG DMA that transfers data located at non-consecutive source addresses of a first memory to data spaces located at consecutive destination addresses of a second memory.

Also, as an example, the rule table may be as follows. Meanwhile, the table is only an example of the rule table and is not limited thereto.

[Table 5]

| Sum[ OperationDataSize$_0$, OperationDataSize$_2$] | OperationDataSize | SourceStart*Addr* |
|---|---|---|
| HiddendataSize | HiddenSataSize/2 | *Dest*Start*Addr* |
| 0 | 0 | OperationDataSize |

$$\begin{bmatrix} DecodingStep_i \\ OperationStep_j \\ 1 \end{bmatrix}$$

For example, referring to Table 5, $a_{00}$ of the coefficient matrix of the rule table may be set to Sum [OperationDataSize$_0$, OperationDataSize$_2$], $a_{01}$ to OperationDataSize, $c_0$ to SourceStartAddr, $a_{10}$ to HiddenDataSize, $a_{11}$ to HiddenDataSize/2, $c_1$ to DestStartAddr, $a_{20}$ to 0, $a_{21}$ to 0, and $c_2$ to OperationDataSize. $a_{11}$ may also be HiddenDataSize/NumberofOperation.

Figure 7:
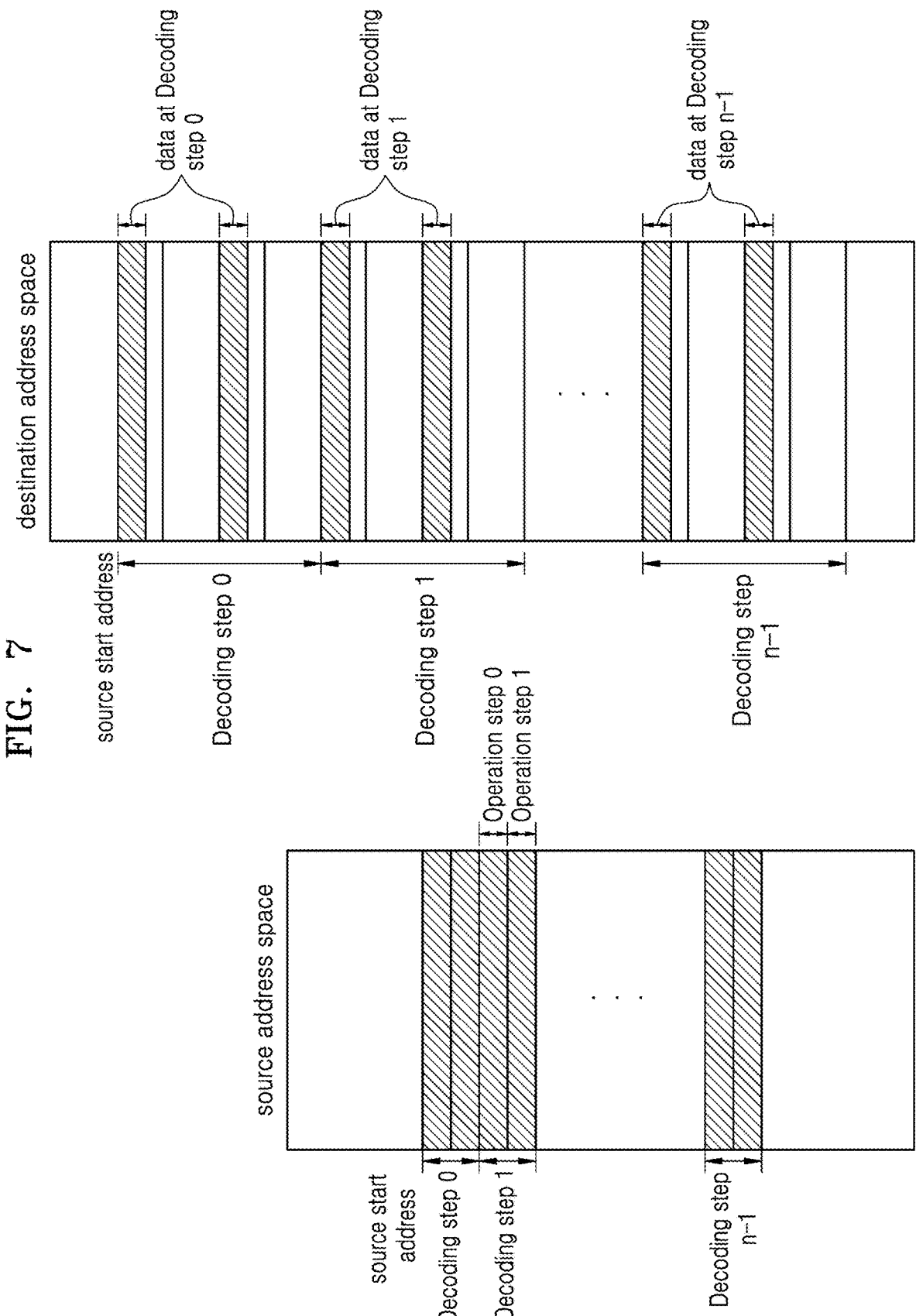
FIG. 7 is a diagram illustrating a scatter operation of SG DMA according to an embodiment of the present disclosure.

FIG. 7 is a diagram illustrating a scatter operation of SG DMA according to an embodiment of the present disclosure. As illustrated in FIG. 7, the scatter operation of SG DMA may be performed based on the rule table according to the table 5 and the equation 3. In addition, for example, Decoding-Step$_i$, a variable of the rule table, may be derived as NumberofOperation*(SubtaskNum$_k$ mod NumberofOperation), and OperationStep$_j$ may be derived as SubtaskNum$_k$/NumberofOperation.

For example, when the rule table according to the table 4 and the equation 3 is applied, a source address equation, a destination address equation, and a data size equation for a subtask of SG DMA may be derived as follows. The rule table may be a rule table set for N specific subtasks, and a source address, a destination address, and a data size for each of the N specific subtasks may be derived using the source address equation, the destination address equation, and the data size equation derived based on the rule table.

$$\begin{aligned} \text{SourceAddress}(i, j) &= \\ \text{OperationDataSize} &* n + \text{SourceStart}Addr \end{aligned}$$ [Equation 5]

$$\begin{aligned} Dest\text{Address}(i, j) &= \\ \text{HiddenData} * i + (HiddenData/2) * j + Dest\text{Start}Addr \end{aligned}$$

$$\text{Size}(i, j) = \text{OperationDataSize}$$

For example, referring to the equation 5, data for a subtask of SG DMA may be derived as shown in the following table.

TABLE 6

Subtask #0
SourceAddress(0, 0) = OperationDataSize × 0 + SourceStartAddr
DestAddress(0, 0) = HiddenData × 0 + (HiddenData/2) × 0 + DestStartAddr
Size(0, 0) = OperationDataSize
Subtask #1
SourceAddress(0, 1) = OperationDataSize × 1 + SourceStartAddr
DestAddress(0, 1) = HiddenData × 0 + (HiddenData/2) × 1 + DestStartAddr
Size(0, 1) = OperationDataSize
Subtask #2
SourceAddress(1, 0) = OperationDataSize × 2 + SourceStartAddr
DestAddress(1, 0) = HiddenData × 1 + (HiddenData/2) × 0 + DestStartAddr
Size(1, 0) = OperationDataSize
Subtask #3
SourceAddress(1, 1) = OperationDataSize × 3 + SourceStartAddr
DestAddress(1, 1) = HiddenData × 1 + (HiddenData/2) × 1 + DestStartAddr
Size(1, 1) = OperationDataSize
Subtask #4
SourceAddress(2, 0) = OperationDataSize × 4 + SourceStartAddr
DestAddress(2, 0) = HiddenData × 2 + (HiddenData/2) × 0 + DestStartAddr
Size(2, 0) = OperationDataSize
Subtask #5
SourceAddress(2, 1) = OperationDataSize × 5 + SourceStartAddr
DestAddress(2, 1) = HiddenData × 2 + (HiddenData/2) × 1 + DestStartAddr
Size(2, 1) = OperationDataSize
. . .
Subtask #n
SourceAddress(n/2, n %2) = OperationDataSize × n + SourceStartAddr
DestAddress(n/2, n %2) = HiddenData × n/2 + (HiddenData/2) × (n %2) + DestStartAddr
Size(n/2, n %2) = OperationDataSize For example, referring to the equation 5, a decoding step index of data for subtask 0 of SG DMA may be derived as 0, and an operation step index of the data may be derived as 0. In addition, the source address (0,0) may be derived as OperationDataSize×0+SourceStartAddr, and the destination address (0,0) may be derived as HiddenData×0+(Hidden-Data/2)×0+DestStartAddr. In addition, for example, the size of the data may be derived as OperationDataSize.

Also, for example, referring to the equation 5, the decoding step index i of the data for the n-th subtask of the SG DMA may be derived as (n % 2), and the operation step index j of the data may be derived as n/2. The source address (i,j) may be derived as OperationDataSize×n+SourceStartAddr, and the destination address (i,j) may be derived as HiddenData×i+(HiddenData/2)×j+DestStartAddr. In addition, for example, the size of the data may be derived as OperationDataSize.

Based on the source address equation, destination address equation, and data size equation derived as in the equation 5, the device may perform a scatter operation of the SG DMA that transfers data located at consecutive source addresses of a first memory to data spaces located at non-consecutive destination addresses of a second memory.

Meanwhile, for example, a plurality of rule tables may be applied to perform the SG DMA operation. For example, information for the plurality of rule tables may be obtained, and the plurality of rule tables may be derived based on the information, and a source address equation, a destination address equation, and a data size equation for each of the rule tables may be derived based on the rule tables. Thereafter, the source address, the destination address, and the data size of the subtasks for each of the plurality of rule tables may be derived based on the source address equation, the destination address equation, and the data size equation of the rule table for the subtasks.

For example, information for a first rule table for M first subtasks and information for a second rule table for N second subtasks may be obtained from the host. The first rule table may be derived based on the information for the first rule table, and a source address equation, a destination address equation, and/or a data size equation for the first subtasks may be derived based on the first rule table. In addition, the second rule table may be derived based on the information for the second rule table, and a source address equation, a destination address equation, and/or a data size equation for the second subtasks may be derived based on the second rule table.

For example, the source address equation, the destination address equation and the data size equation for the first subtasks, and the source address equation, the destination address equation and/or the data size equation for the second subtasks may be as follows.

TABLE 7

M of Subtasks
Source address generation equation: $S \times Subtask_i + C$
Destination address generation equation: $D \times Subtask_i + C$
Data size generation equation: $B \times Subtask_i + C$
N of Subtasks
Source address generation equation: $S_1 \times Subtask_i + S_2 \times Subtask_i + C$
Destination address generation equation: $D \times Subtask_i + C$
Data size generation equation: $B \times Subtask_i + C$
O of Subtasks
Source address generation equation: $S \times Subtask_i + C$
Destination address generation equation: $D_1 \times Subtask_i + D_2 \times Subtask_i + C$
Data size generation equation: $B \times Subtask_i + C$
P of Subtasks
Source address generation equation: $S_1 \times Subtask_i + S_2 \times Subtask_i + C$
Destination address generation equation: $D_1 \times Subtask_i + D_2 \times Subtask_i + C$
Data size generation equation: $B \times Subtask_i + C$
Q of Subtasks
Source address generation equation: $S \times Subtask_i + C$
Destination address generation equation: $D \times Subtask_i + C$
Data size generation equation: C
. . .

As shown in Table 7, various rule tables may be derived. For example, the source address equation, the destination address equation, and/or the data size equation of the rule table may be composed of constants. Or, for example, the source address equation, the destination address equation, and/or the data size equation of the rule table may consist of a term that is a product of a variable and a coefficient. Here, the number of the term may be 1 or more. Or, for example, the source address equation, the destination address equation, and/or the data size equation of the rule table may consist of a constant and a term that is a product of a variable and a coefficient. Here, the number of the term may be 1 or more. For example, the source address equation, the destination address equation, and/or the data size equation of the rule table may be equations for affine transform. Or, for example, the source address equation, the destination address equation, and/or the data size equation of the rule table may be various forms of equations other than affine transform.

For example, Table 7 shows a source address equation, a destination address equation, and a data size equation derived based on the first rule table for M first subtasks, and a source address equation, a destination address equation, and a data size equation derived based on the second rule table for N second subtasks.

For example, source address information, destination address information, and data size information of the first subtasks may be derived based on the source address equation, the destination address equation, and the data size equation for the first subtasks shown in Table 7. For example, by inputting variables for a first target subtask, which is one of the M first subtasks, into the source address equation, the destination address equation, and the data size equation for the first subtasks, the source address, the destination address, and the data size for the first target subtask may be derived.

In addition, for example, source address information, destination address information, and data size information of the second subtasks may be derived based on the source address equation, the destination address equation, and the data size equation for the second subtasks shown in Table 7. For example, by inputting variables for a second target subtask, which is one of the N second subtasks, into the source address equation, the destination address equation, and the data size equation for the second subtasks, the source address, the destination address, and the data size for the second target subtask may be derived.

Through this, the SG DMA operation may be performed based on the plurality of rule tables, and the information transfer process for performing the SG DMA operation at locations according to various rules for performing LLM task may be reduced, thereby reducing complexity and improving efficiency.

Figure 8:
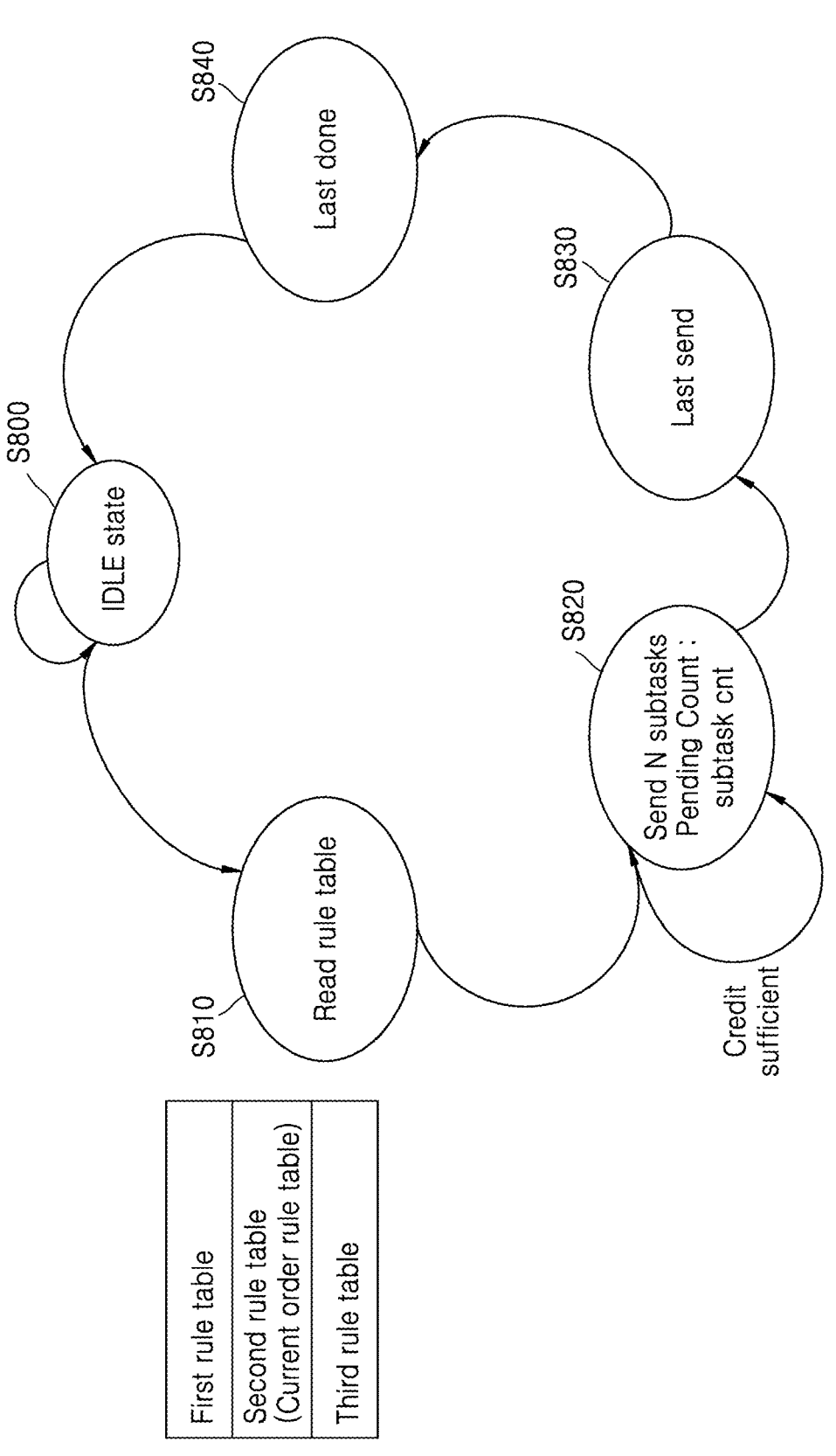
FIG. 8 exemplarily illustrates a cycle of the SG DMA operation performed in a DMA engine according to an embodiment of the present disclosure.

FIG. 8 exemplarily illustrates a cycle of the SG DMA operation performed in a DMA engine according to an embodiment of the present disclosure.

Referring to FIG. 8, the DMA engine may be in an IDLE state not performing an SG DMA operation (S800), and after receiving an SG DMA operation request, may read a rule table for N specific subtasks of a current order (S810). The DMA engine may derive a source address, a destination address, and/or a data size for each of the specific subtasks based on the rule table, and may perform the SG DMA operation for each of the specific subtasks (S820).

The DMA engine may perform the SG DMA operation on a subtask of the last order of the specific subtasks (S830), and can determine whether an SG DMA operation of a subtask of a next order of the specific subtasks exists (S840). If the SG DMA operation of the subtask of the next order exists, the DMA engine may read a rule table of the next order of the N specific subtasks by increasing the rule table index. The SG DMA operation of the next order may be performed based on the rule table of the next order. In addition, if the SG DMA operation of the subtask of the next order does not exist, the DMA engine may be switched to an idle state in which the SG DMA operation is not performed.

Meanwhile, the state machine may process commands of types other than a command type associated with it separately and in parallel with the execution of the SG DMA operation. Therefore, a DMA engine with an extended idle state may be proposed.

Figure 9:
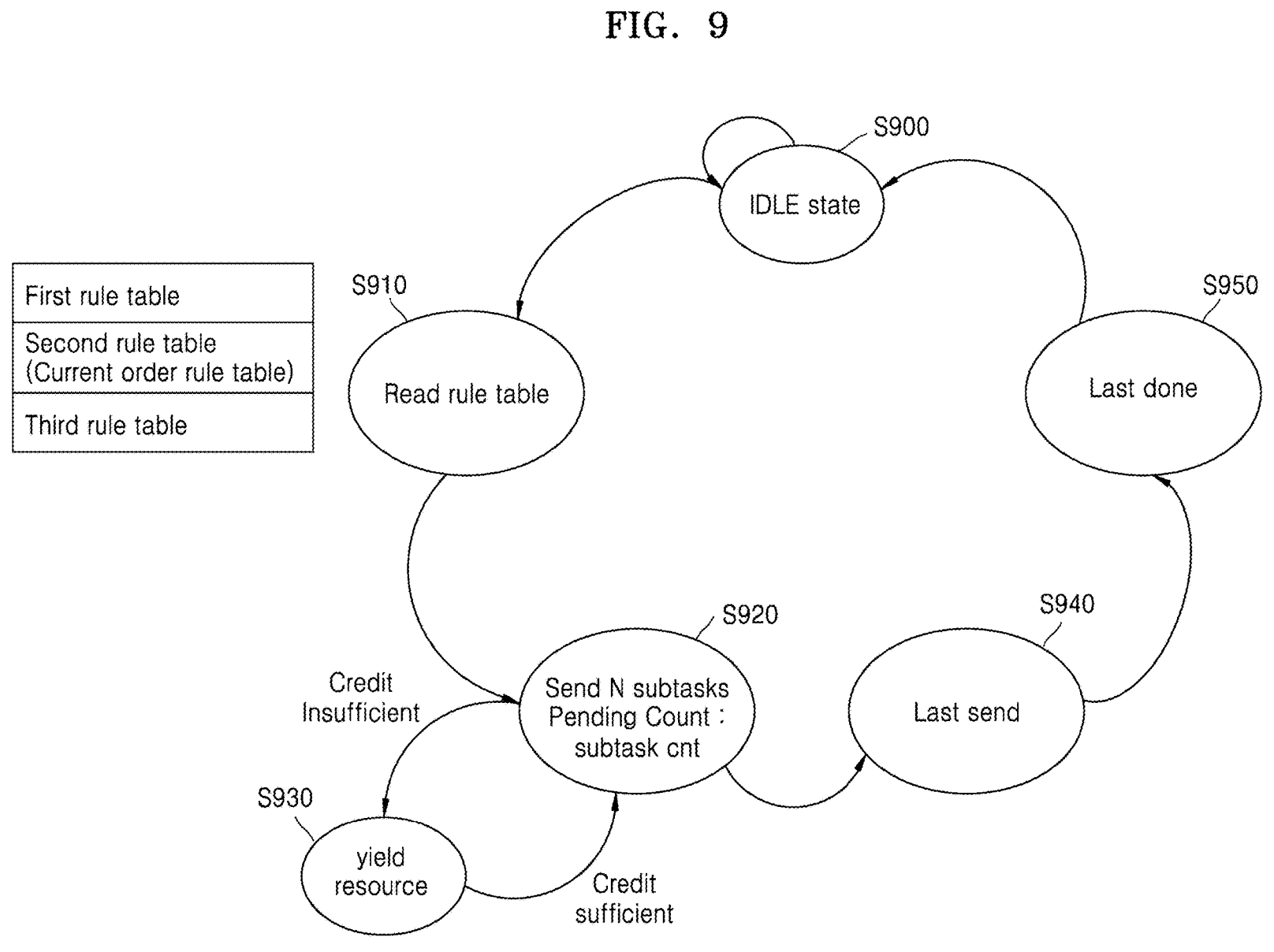

FIG. 9 exemplarily illustrates a cycle of the SG DMA operation performed in a DMA engine according to another embodiment of the present disclosure.

For example, referring to FIG. 9, a DMA engine may be proposed that when a DMA IP is busy state, it transitions to an idle state while yielding processing resources to other IPs, and then performs a subtask again when sufficient credits are available to perform a SG DMA operation.

Referring to FIG. 9, the DMA engine may be in an IDLE state not performing a SG DMA operation (S900), and after receiving a SG DMA operation request, may read a rule table for N specific subtasks of a current order (S910). The DMA engine may derive a source address, a destination address, and/or a data size for each of the specific subtasks based on the rule table, and may perform a SG DMA operation for each of the specific subtasks (S920). In addition, when a DMA ip is busy state while sequentially processing the specific subtasks, i.e., when there is insufficient credit for performing the SG DMA operation, the DMA engine may yield processing resources to another ip (S930), and thereafter, when the credit is sufficiently filled, the DMA engine may perform a SG DMA operation of the next subtask again (S920).

The DMA engine may perform a SG DMA operation for a subtask of the last order of the specific subtasks (S940), and may determine whether a SG DMA operation of a subtask of a next order of the specific subtasks exists (S950). If the SG DMA operation of the next order of the subtask exists, the DMA engine may increase a rule table index to read a rule table of the next order of the rule tables of the N specific subtasks. The SG DMA operation of the next order may be performed based on the rule table of the next order. In addition, if the SG DMA operation of the next order of the subtask does not exist, the DMA engine may be switched to an idle state in which the SG DMA operation is not performed.

FIG. 10 is a flowchart explaining in detail a DMA method of an electronic device for AI task according to an embodiment of the present disclosure.

A device of an electronic device obtains information for a rule table for specific subtasks of a scatter gather direct memory access (SG DMA) from a host (S1000). The device of the electronic device may obtain information for the rule table for the specific subtasks of the SG DMA from the host.

For example, the electronic device may include a command processor (CP) that operates firmware for a SG DMA operation and a device that performs a SG DMA operation between a first memory and a second memory. The device may be a direct memory access (DMA) engine included in the electronic device. For example, the device may be a DMA engine that is a separate device from a processing core of the electronic device. That is, the DMA engine may be the first DMA engine described above. Or, for example, the device may be a DMA engine included in a processing core of the electronic device. That is, the DMA engine may be the second DMA engine described above. For example, as described above, the electronic device may include a CP, a main memory, at least one processing core, a first DMA device, and/or an L2 cache.

For example, the rule table for the specific subtasks may include a coefficient matrix including coefficients and a variable matrix including variables. The information for the rule table for the specific subtasks may include information for the coefficient matrix and/or information for the variable matrix. For example, the information for the coefficient matrix may represent values of the coefficients. Or, for example, the information for the coefficient matrix may represent equations of the coefficients. Or, for example, the information for the coefficient matrix may represent values and/or equations of the coefficients. Also, for example, the information for the variable matrix may represent values of the variables. Or, for example, the information for the variable matrix may represent equations of the variables. Or, for example, the information for the variable matrix may represent values and/or equations of the variables.

Alternatively, for example, the device of the electronic device may obtain information for a plurality of rule tables from the host. For example, information for a plurality of rule tables may be obtained from the host.

For example, information for a first rule table for M first subtasks and information for a second rule table for N second subtasks may be obtained from the host.

For example, the first rule table for the first subtasks may include a coefficient matrix including coefficients for the first subtasks and a variable matrix including variables for the first subtasks. The information for the first rule table for the first subtasks may include information for the coefficient matrix and/or information for the variable matrix. For example, the information for the coefficient matrix may represent values of the coefficients for the first subtasks. Or, for example, the information for the coefficient matrix may represent equations of the coefficients for the first subtasks. Or, for example, the information for the coefficient matrix may represent values and/or equations of the coefficients for the first subtasks. Also, for example, the information for the variable matrix may represent values of the variables for the first subtasks. Or, for example, the information for the variable matrix may represent equations of the variables for the first subtasks. Alternatively, for example, the information for the variable matrix may represent values and/or equations of the variables for the first subtasks.

In addition, for example, the second rule table for the second subtasks may include a coefficient matrix including coefficients for the second subtasks and a variable matrix including variables for the second subtasks. The information for the second rule table for the second subtasks may include data about the coefficient matrix and/or data about the variable matrix. For example, the information for the coefficient matrix may represent values of the coefficients for the second subtasks. Or, for example, the information for the coefficient matrix may represent equations of the coefficients for the second subtasks. Or, for example, the information for the coefficient matrix may represent values and/or equations of the coefficients for the second subtasks. In addition, for example, the information for the variable matrix may represent values of the variables for the second subtasks. Or, for example, the information for the variable matrix may represent equations of the variables for the second subtasks. Alternatively, for example, information for the variable matrix may represent values and/or equations of the variables for the second subtasks.

Alternatively, for example, information for the rule table for the specific subtasks may be information pre-stored in the device. For example, information for the coefficient matrix and/or information for the variable matrix may be information pre-stored in the device.

The device derives the rule table for the specific subtasks based on the information (S1010). The rule table for the specific subtasks may be derived based on the rule table for the specific subtasks.

For example, the rule table for the specific subtasks may include a coefficient matrix including coefficients and a variable matrix including variables.

For example, the coefficient matrix may be derived based on information for the coefficient matrix. For example, the information for the coefficient matrix may represent values of the coefficients included in the coefficient matrix, and the coefficient matrix including the values as the coefficients may be derived. Or, for example, the information for the coefficient matrix may represent equations of the coefficients included in the coefficient matrix, and the coefficient matrix including values derived based on the equations as the coefficients may be derived. Or, for example, the information for the coefficient matrix may represent an equation of a first coefficient and a value of a second coefficient, and the coefficient matrix including a value of the first coefficient derived based on the equation and the value of the second coefficient as the coefficients may be derived.

In addition, for example, the variable matrix may be derived based on the information for the variable matrix. For example, the information for the variable matrix may represent equations of the variables included in the variable matrix, and the variable matrix may be derived including values derived based on the equations as the variables.

For example, the information for the variable matrix may be equations of the variables included in the variable matrix that use a subtask index. In this case, for example, variables of a target subtask among the specific subtasks may be derived based on the equations that use a subtask index of the target subtask, and the variable matrix including the variables of the derived values may be derived.

In addition, for example, information for the plurality of rule tables may be obtained, and the plurality of rule tables may be derived based on the information for the plurality of rule tables.

For example, information for the first rule table for the first subtasks and information for the second rule table for the second subtasks may be obtained from the host. The first rule table may be derived based on the information for the first rule table for the first subtasks, and the second rule table may be derived based on the information for the second rule table for the second subtasks.

The device derives source addresses, destination addresses, and data sizes for the specific subtasks based on the rule table (S1020).

For example, the device may derive the source address equation, the destination address equation, and/or the data size equation based on the rule table. The device may input the variables for the target subtask into the source address equation, the destination address equation, and the data size equation to derive a source address, a destination address, and a data size for the target subtask.

For example, a source address equation for deriving the source addresses, a destination address equation for deriving the destination addresses, and a data size equation for deriving the data sizes may be derived based on a matrix operation of the coefficient matrix and the variable matrix. For example, the coefficients may include coefficients of the source address equation, coefficients of the destination address equation, and coefficients of the data size equation.

For example, the coefficient matrix may include three rows. For example, rows of the coefficient matrix may include a row including the coefficients of the source address equation, a row including the coefficients of the destination address equation, and a row including the coefficients of the data size equation. For example, a first row of the coefficient matrix may be a row including the coefficients of the source address equation, a second row of the coefficient matrix may be a row including the coefficients of the destination address equation, and a third row of the coefficient matrix may be a row including the coefficients of the data size equation. The row including the coefficients of the source address equation, the row including the coefficients of the destination address equation, or the row including the coefficients of the data size equation may be located in one of the rows of the coefficient matrix.

For example, the coefficient matrix may be a matrix of size 3×3. For example, the coefficients of the source address equation may include (0,0) coefficient, (0,1) coefficient, (0,2) coefficient, the coefficients of the destination address equation may include (1,0) coefficient, (1,1) coefficient, (1,2) coefficient, and the coefficients of the data size equation may include (2,0) coefficient, (2,1) coefficient, (2,2) coefficient. Here, a (m, n) coefficient may mean a coefficient located at a (m, n) coordinate from the coordinate where a location of an upper left coefficient of the matrix is (0,0). For example, the coefficients of the source address equation may include a decoding step data space size, a value obtained by dividing the decoding step data space size by the number of operation steps in which SG DMA is performed during the decoding step (i.e., the decoding step data space size/the number of operation steps in which SG DMA is performed during the decoding step), and a source start address. That is, for example, the (0,0) coefficient may be a decoding step data space size, the (0,1) coefficient may be a value obtained by dividing the decoding step data space size by the number of operation steps in which SG DMA is performed during the decoding step (i.e., decoding step data space size/number of operation steps in which SG DMA is performed during the decoding step), and the (0,2) coefficient may be a source start address. In addition, for example, the coefficients of the destination address equation may include a data space sum size of operation steps in which SG DMA is performed among the decoding step data space, an operation step data space size, and a destination start address. That is, for example, the (1,0) coefficient may be the data space sum size of the operation steps in which SG DMA is performed among the decoding step data space, the (1,1) coefficient may be the operation step data space size, and the (1,2) coefficient may be the destination start address. In addition, for example, the coefficients of the data size equation may include a first value, a second value, and an operation step data space size. That is, for example, the (2,0) coefficient may be a first value, the (2,1) coefficient may be a second value, and the (2,2) coefficient may be an operation step data space size. For example, the first value and the second value may be the same integer value. For example, the first value and the second value may be 0. Or, for example, the first value and the second value may be different integer values.

In addition, for example, the variables may be variables for the target subtask that are input values of the source address equation, the destination address equation, and the data size equation. For example, the variables for the target subtask may include a decoding step index and/or an operation step index of the target subtask. For example, the coefficient matrix may include three rows. For example, the variable matrix may be a matrix of size 3×1, and a (0,0) variable of the variable matrix may be a decoding step index of the target subtask, a (1,0) variable of the variable matrix may be an operation step index of the target subtask, and a (2,0) variable of the variable matrix may be a specific integer value. For example, the (2,0) variable of the variable matrix may be 1.

In addition, for example, variables of the target subtask among the specific subtasks may be derived based on the equations using the subtask index of the target subtask. For example, the decoding step index and/or the operation step index of the target subtask may be derived based on the equations using the subtask index of the target subtask.

In addition, for example, source addresses, destination addresses, and data sizes for subtasks may be derived based on the plurality of rule tables.

For example, source addresses, destination addresses, and data sizes for the first subtasks may be derived based on the first rule table for the first subtasks, and source addresses, destination addresses, and data sizes for the second subtasks may be derived based on the second rule table for the second subtasks.

For example, a source address equation, a destination address equation, and/or a data size equation for the first subtasks may be derived based on the first rule table, and a source address, a destination address, and/or a data size for a first target subtask may be derived by inputting variables for the first target subtask of the first subtasks into the source address equation, the destination address equation, and/or the data size equation. In addition, for example, a source address equation, a destination address equation, and/or a data size equation for the second subtasks may be derived based on the second rule table, and a source address, a destination address, and/or a data size for a second target subtask may be derived by inputting variables for the second target subtask of the second subtasks into the source address equation, the destination address equation, and/or the data size equation.

In addition, for example, source addresses, destination addresses and data sizes for the specific subtasks may be derived based on the rule table in the host. In this case, the source addresses, destination addresses and data sizes for the specific subtasks derived from the host may be transmitted to the device.

The device performs a SG DMA operation to transfer data of the data sizes located at the source addresses of a first memory to data spaces of the data sizes located at the destination addresses of a second memory (S1130).

For example, the device may transfer data located at the derived source addresses of the first memory to data spaces located at the destination addresses of the second memory. Data located at the derived source addresses of the first memory may be transferred to data spaces located at the destination addresses of the second memory. For example, the device may perform a gather operation of SG DMA to transfer data located at non-consecutive source addresses of the first memory to data spaces located at consecutive destination addresses of the second memory. Or, for example, the device may perform a scatter operation of SG DMA to transfer data located at consecutive source addresses of the first memory to data spaces located at non-consecutive destination addresses of the second memory.

For example, the first memory may be a main memory of the electronic device, and the second memory may be an L2 cache of the electronic device. In this case, the device may be a DMA engine that is a separate device from a processing core of the electronic device. That is, the DMA engine may be the first DMA engine described above.

Alternatively, for example, the first memory may be an L2 cache of the electronic device, and the second memory may be a main memory of the electronic device. In this case, the device may be a DMA engine that is a separate device from a processing core of the electronic device. That is, the DMA engine may be the first DMA engine described above.

Alternatively, for example, the first memory may be a main memory of the electronic device, and the second memory may be an L1 cache configured in a processing core of the electronic device. In this case, the device may be a DMA engine configured in the processing core of the electronic device. That is, the DMA engine may be the second DMA engine described above.

Alternatively, for example, the first memory may be an L1 cache configured in a processing core of the electronic device, and the second memory may be a main memory of the electronic device. In this case, the device may be a DMA engine configured in the processing core of the electronic device. That is, the DMA engine may be the second DMA engine described above.

Alternatively, for example, the first memory may be an L2 cache of the electronic device, and the second memory may be an L1 cache configured in a processing core of the electronic device. In this case, the device may be a DMA engine configured in the processing core of the electronic device. That is, the DMA engine may be the second DMA engine described above.

Alternatively, for example, the first memory may be an L1 cache configured in a processing core of the electronic device, and the second memory may be an L2 cache of the electronic device. In this case, the device may be a DMA engine configured in the processing core of the electronic device. That is, the DMA engine may be the second DMA engine described above.

The data processing method and electronic device using a scatter gather direct memory access (SG DMA) in the AI service providing system according to the embodiments described above may perform a SG DMA operation with information for a subtask of the SG DMA generated based on a rule table, thereby generating the effect of reducing the space complexity for the SG DMA operation.

In addition, an embodiment of performing a SG DMA operation using a rule table that may be set to various constants and/or coefficients may produce an effect of improving the efficiency of performing a SG DMA operation by adaptively considering a data transfer structure.

In addition, a SG DMA operation may be performed based on a plurality of rule tables, thereby reducing the information transfer process for performing a SG DMA operation at a location according to various rules for performing LLM task, thereby reducing complexity and improving efficiency.

Although the present disclosure described above has been described with reference to the embodiments illustrated in the drawings, these are merely exemplary, and those skilled in the art will understand that various modifications and variations of the embodiments are possible. That is, the scope of the present disclosure is not limited to the above-described embodiments, and various modifications and improvements made by those skilled in the art using the basic concept of the embodiments defined in the following claims also included in the scope of the embodiments. Therefore, the scope of the present disclosure is defined by the technical spirit of the appended claims.

What is claimed is:

1. A data processing method using a scatter gather direct memory access (SG DMA), the method comprising:
  obtaining information for a rule table for specific subtasks of a SG DMA from a host;
  deriving the rule table for the specific subtasks based on the information;

deriving source addresses, destination addresses and data sizes for the specific subtasks of the SG DMA based on the rule table wherein a target subtask of the SG DMA includes one or more decoding steps, and wherein each of the decoding steps includes one or more operation steps; and performing a SG DMA operation to transfer data of the data sizes located at the source addresses of a first memory to data spaces of the data sizes located at the destination addresses of a second memory, wherein the rule table includes a coefficient matrix including coefficients and a variable matrix including variables, wherein based on a matrix operation of the coefficient matrix and the variable matrix, a source address equation for deriving the source addresses, a destination address equation for deriving the destination addresses, and a data size equation for deriving the data sizes are derived, wherein the source address equation is derived by a matrix operation of a first row of the coefficients of the coefficient matrix and a column of the variables of the variable matrix, the destination equation is derived by a matrix operation of a second row of the coefficients of the coefficient matrix and the column of the variables of the variable matrix, and the data size equation is derived by a matrix operation of a third row of the coefficients of the coefficient matrix and the column of the variables of the variable matrix, wherein the first row of coefficients includes a source data size of the decoding steps, a source data size of the operation steps, and a source start address of the decoding steps, wherein the second row of coefficients includes a destination data size of the decoding steps, a destination data size of the operation steps, and a destination start address of the decoding steps, wherein the third row of coefficients includes the source data size of the operation steps or the destination data size of the operation steps; and wherein the column of the variables includes a cache index of the decoding steps and a cache index of the operation steps within the decoding steps.

2. The method of claim 1, wherein the coefficients include coefficients of the source address equation, coefficients of the destination address equation, and coefficients of the data size equation, wherein the variables are variables for the target subtask that are input values of the source address equation, the destination address equation, and the data size equation.

3. The method of claim 2, wherein the deriving the source addresses, the destination addresses and the data sizes for the specific subtasks based on the rule table comprises:

deriving the source address equation, the destination address equation, the data size equation based on the rule table; and deriving a source address, a destination address and a data size for the target subtask by inputting values of the variables for the target subtask into the source address equation, the destination address equation, the data size equation.

4. The method of claim 2, wherein the variables for the target subtask include a decoding step index and an operation step index of the target subtask.

5. The method of claim 4, wherein the variables of the target subtask are derived based on a subtask index of the target subtask.

6. The method of claim 2, wherein the coefficient matrix is a 3×3 matrix, and wherein rows of the coefficient matrix include the first row of coefficients including coefficients of the source address equation, the second row of coefficients including coefficients of the destination address equation, and the third row of coefficients including coefficients of the data size equation.

7. The method of claim 6, wherein the coefficients of the source address equation include a decoding step data space size, an operation step value obtained by dividing the decoding step data space size by the number of operation steps in which the SG DMA is performed during a decoding step, and the source start address, wherein the coefficients of the destination address equation include a data space sum size of the operation steps in which the SG DMA is performed during the decoding step data space, an operation step data space size, and the destination start address, wherein the coefficients of the data size equation include a first integer value, a second integer value, and an operation step data space size that includes the operation step value of the source address equation or the operation step data space size of the destination address equation.

8. The method of claim 1, wherein information for a first rule table for first subtasks and information for a second rule table for second subtasks are obtained from the host, and wherein the first rule table is derived based on the information for the first rule table for the first subtasks, and the second rule table is derived based on the information for the second rule table for the second subtasks.

9. The method of claim 8, wherein a source address equation, a destination address equation, and a data size equation for the first subtasks are derived based on the first rule table, and wherein a source address, a destination address, and a data size for a first target subtask are derived by inputting values of variables for the first target subtask of the first subtasks into the source address equation, the destination address equation, and the data size equation.

10. The method of claim 1, wherein the performing the SG DMA operation to transfer the data of the data sizes located at the source addresses of the first memory to the data spaces of the data sizes located at the destination addresses of the second memory comprises:

performing a gather operation to transfer the data located at the non-consecutive source addresses of the first memory to the data spaces located at the consecutive destination addresses of the second memory.

11. The method of claim 1, wherein the performing the SG DMA operation to transfer the data of the data sizes located at the source addresses of the first memory to the data spaces of the data sizes located at the destination addresses of the second memory comprises:

performing a scatter operation to transfer the data located at the consecutive source addresses of the first memory to the data spaces located at the non-consecutive destination addresses of the second memory.

12. An electronic device, comprising:

a Command Processor (CP) operating firmware for a scatter gather direct memory access (SG DMA) operation; and a device performing a SG DMA operation between a first memory and a second memory, wherein the device configured to:

obtain information for a rule table for specific subtasks of a SG DMA from a host;

derive the rule table for the specific subtasks based on the information;

derive source addresses, destination addresses and data sizes for the specific subtasks of the SG DMA based on the rule table wherein a target subtask of the SG DMA includes one or more decoding steps, and wherein each of the decoding steps includes one or more operation steps; and perform a SG DMA operation to transfer data of the data sizes located at the source addresses of the first memory to data spaces of the data sizes located at the destination addresses of the second memory, wherein the rule table includes a coefficient matrix including coefficients and a variable matrix including variables, wherein based on a matrix operation of the coefficient matrix and the variable matrix, a source address equation for deriving the source addresses, a destination address equation for deriving the destination addresses, and a data size equation for deriving the data sizes are derived, wherein the source address equation is derived by a matrix operation of a first row of the coefficients of the coefficient matrix and a column of the variables of the variable matrix, the destination equation is derived by a matrix operation of a second row of the coefficients of the coefficient matrix and the column of the variables of the variable matrix, and the data size equation is derived by a matrix operation of a third row of the coefficients of the coefficient matrix and the column of the variables of the variable matrix, wherein the first row of coefficients includes a source data size of the decoding steps, a source data size of the operation steps, and a source start address of the decoding steps, wherein the second row of coefficients includes a destination data size of the decoding steps, a destination data size of the operation steps, and a destination start address of the decoding steps, wherein the third row of coefficients includes the source data size of the operation steps or the destination data size of the operation steps; and wherein the column of the variables includes a cache index of the decoding steps and a cache index of the operation steps within the decoding steps.

13. The electronic device of claim 12, wherein the coefficients include coefficients of the source address equation, coefficients of the destination address equation, and coefficients of the data size equation, wherein the variables are variables for the target subtask that are input values of the source address equation, the destination address equation, and the data size equation.

14. The electronic device of claim 13, wherein the device derives the source address equation, the destination address equation, and the data size equation based on the rule table, and derives a source address, a destination address and a data size for the target subtask by inputting values of the variables for the target subtask into the source address equation, the destination address equation, the data size equation.

15. The electronic device of claim 13, wherein the variables for the target subtask include a decoding step index and an operation step index of the target subtask.

16. The electronic device of claim 15, wherein the variables of the target subtask are derived based on a subtask index of the target subtask.

17. The electronic device of claim 13, wherein the coefficient matrix is a 3×3 matrix, and wherein rows of the coefficient matrix include the first row of coefficients including coefficients of the source address equation, the second row of coefficients including coefficients of destination address equation, and the third row of coefficients including coefficients of the data size equation.

18. The electronic device of claim 17, wherein the coefficients of the source address equation include a decoding step data space size, an operation step value obtained by dividing the decoding step data space size by the number of operation steps in which the SG DMA is performed during a decoding step, and the source start address, wherein the coefficients of the destination address equation include a data space sum size of the operation steps in which the SG DMA is performed during the decoding step data space, an operation step data space size, and the destination start address, wherein the coefficients of the data size equation include a first integer value, a second integer value, and an operation step data space size that includes the operation step value of the source address equation or the operation step data space size of the destination address equation.

19. The electronic device of claim 12, wherein information for a first rule table for first subtasks and information for a second rule table for second subtasks are obtained from the host, and wherein the first rule table is derived based on the information for the first rule table for the first subtasks, and the second rule table is derived based on the information for the second rule table for the second subtasks.

20. The electronic device of claim 19, wherein a source address equation, a destination address equation, and a data size equation for the first subtasks are derived based on the first rule table, and wherein a source address, a destination address, and a data size for a first target subtask are derived by inputting values of variables for the first target subtask of the first subtasks into the source address equation, the destination address equation, and the data size equation.

\* \* \* \* \*